(12) United States Patent
McCann et al.

(10) Patent No.: US 8,958,306 B2
(45) Date of Patent: Feb. 17, 2015

(54) METHODS, SYSTEMS, AND COMPUTER READABLE MEDIA FOR PROVIDING DIAMETER SIGNALING ROUTER WITH INTEGRATED MONITORING FUNCTIONALITY

(75) Inventors: Thomas M. McCann, Raleigh, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 12/906,816

(22) Filed: Oct. 18, 2010

(65) Prior Publication Data

US 2011/0116382 A1   May 19, 2011

Related U.S. Application Data

(60) Provisional application No. 61/252,557, filed on Oct. 16, 2009.

(51) Int. Cl.
*H04L 12/28* (2006.01)
*H04L 29/06* (2006.01)
*H04W 12/06* (2009.01)

(52) U.S. Cl.
CPC ........ *H04L 63/0227* (2013.01); *H04L 63/0263* (2013.01); *H04L 63/0892* (2013.01); *H04W 12/06* (2013.01)
USPC ........... 370/241; 370/252; 455/405; 455/406; 709/238

(58) Field of Classification Search
None
See application file for complete search history.

(56) References Cited

U.S. PATENT DOCUMENTS

| | | | |
|---|---|---|---|
| 4,310,727 | A | 1/1982 | Lawser |
| 4,754,479 | A | 6/1988 | Bicknell et al. |
| 5,089,954 | A | 2/1992 | Rago |
| 5,228,083 | A | 7/1993 | Lozowick et al. |
| 5,237,604 | A | 8/1993 | Ryan |
| 5,247,571 | A | 9/1993 | Kay et al. |
| 5,251,248 | A | 10/1993 | Tokunaga et al. |
| 5,400,390 | A | 3/1995 | Salin |

(Continued)

FOREIGN PATENT DOCUMENTS

| | | |
|---|---|---|
| CA | 2 716 544 A1 | 12/2010 |
| CN | 1809072 A | 7/2006 |

(Continued)

OTHER PUBLICATIONS

Jones et al., Diameter Command Code Registration for the Third Generation Partnership Project (3GPP) Evolved Packet System (EPS), Apr. 2009, Network Working Group, RFC 5516, pp. 1-5.*

(Continued)

*Primary Examiner* — Nicholas Sloms
(74) *Attorney, Agent, or Firm* — Jenkins, Wilson, Taylor & Hunt, P.A.

(57) ABSTRACT

According to one aspect, the subject matter described herein includes a system for providing a Diameter signaling router with integrated monitoring functionality. The system includes a Diameter signaling router comprising a network interface for receiving, from a first Diameter node, a first Diameter message having Diameter information. The system also includes an integrated monitoring module located within the Diameter signaling router for copying at least a portion of the first Diameter message and providing the copied information associated with the first Diameter message to an application.

19 Claims, 14 Drawing Sheets

(56) References Cited

U.S. PATENT DOCUMENTS

| | | | |
|---|---|---|---|
| 5,422,941 | A | 6/1995 | Hasenauer et al. |
| 5,423,068 | A | 6/1995 | Hecker |
| 5,430,719 | A | 7/1995 | Weisser, Jr. |
| 5,442,683 | A | 8/1995 | Hoogeveen |
| 5,455,855 | A | 10/1995 | Hokari |
| 5,457,736 | A | 10/1995 | Cain et al. |
| 5,481,603 | A | 1/1996 | Gutierrez et al. |
| 5,502,726 | A | 3/1996 | Fischer |
| 5,504,804 | A | 4/1996 | Widmark et al. |
| 5,526,400 | A | 6/1996 | Nguyen |
| 5,579,372 | A | 11/1996 | Åström |
| 5,590,398 | A | 12/1996 | Matthews |
| 5,594,942 | A | 1/1997 | Antic et al. |
| 5,623,532 | A | 4/1997 | Houde et al. |
| 5,689,548 | A | 11/1997 | Maupin et al. |
| 5,706,286 | A | 1/1998 | Reiman et al. |
| 5,711,002 | A | 1/1998 | Foti |
| 5,719,861 | A | 2/1998 | Okanoue |
| 5,819,178 | A | 10/1998 | Cropper |
| 5,822,694 | A | 10/1998 | Coombes et al. |
| 5,832,382 | A | 11/1998 | Alperovich |
| 5,854,982 | A | 12/1998 | Chambers et al. |
| 5,878,347 | A | 3/1999 | Joensuu et al. |
| 5,878,348 | A | 3/1999 | Foti |
| 5,890,063 | A | 3/1999 | Mills |
| 5,953,662 | A | 9/1999 | Lindquist et al. |
| 5,953,663 | A | 9/1999 | Maupin et al. |
| 5,983,217 | A | 11/1999 | Khosravi-Sichannie et al. |
| 6,006,098 | A | 12/1999 | Rathnasabapathy et al. |
| 6,011,803 | A | 1/2000 | Bicknell et al. |
| 6,014,557 | A | 1/2000 | Morton et al. |
| 6,018,657 | A | 1/2000 | Kennedy, III et al. |
| 6,038,456 | A | 3/2000 | Colby et al. |
| 6,049,714 | A | 4/2000 | Patel |
| 6,097,960 | A | 8/2000 | Rathnasabapathy et al. |
| 6,115,463 | A | 9/2000 | Coulombe et al. |
| H1895 | H | 10/2000 | Hoffpauir et al. |
| 6,128,377 | A | 10/2000 | Sonnenberg |
| 6,137,806 | A | 10/2000 | Martinez |
| 6,138,016 | A | 10/2000 | Kulkarni et al. |
| 6,138,017 | A | 10/2000 | Price et al. |
| 6,138,023 | A | 10/2000 | Agarwal et al. |
| 6,144,857 | A | 11/2000 | Price et al. |
| 6,148,204 | A | 11/2000 | Urs et al. |
| 6,157,621 | A | 12/2000 | Brown et al. |
| 6,192,242 | B1 | 2/2001 | Rollender |
| 6,205,210 | B1 | 3/2001 | Rainey et al. |
| 6,226,517 | B1 | 5/2001 | Britt et al. |
| 6,236,365 | B1 | 5/2001 | LeBlanc et al. |
| 6,263,212 | B1 | 7/2001 | Ross et al. |
| 6,273,622 | B1 | 8/2001 | Ben-David |
| 6,304,273 | B1 | 10/2001 | Bonnet |
| 6,308,075 | B1 | 10/2001 | Irten et al. |
| 6,327,350 | B1 | 12/2001 | Spangler et al. |
| 6,377,674 | B1 | 4/2002 | Chong et al. |
| 6,411,632 | B2 | 6/2002 | Lindgren et al. |
| 6,424,702 | B1 | 7/2002 | Blumenschein et al. |
| 6,424,832 | B1 | 7/2002 | Britt et al. |
| 6,463,055 | B1 | 10/2002 | Lupien et al. |
| 6,505,046 | B1 | 1/2003 | Baker |
| 6,515,997 | B1 | 2/2003 | Feltner et al. |
| 6,535,746 | B1 | 3/2003 | Yu et al. |
| 6,539,077 | B1 | 3/2003 | Ranalli et al. |
| 6,560,216 | B1 | 5/2003 | McNiff et al. |
| 6,560,456 | B1 | 5/2003 | Lohtia et al. |
| 6,574,481 | B1 | 6/2003 | Rathnasabapathy et al. |
| 6,577,723 | B1 | 6/2003 | Mooney |
| 6,584,073 | B1 | 6/2003 | Steele, Jr. et al. |
| 6,594,258 | B1 | 7/2003 | Larson et al. |
| 6,611,516 | B1 | 8/2003 | Pirkola et al. |
| 6,643,511 | B1 | 11/2003 | Rune et al. |
| 6,662,017 | B2 | 12/2003 | McCann et al. |
| 6,683,881 | B1 | 1/2004 | Mijares et al. |
| 6,684,073 | B1 | 1/2004 | Joss et al. |
| 6,725,401 | B1 | 4/2004 | Lindhorst-Ko |
| 6,731,926 | B1 | 5/2004 | Link, II et al. |
| 6,738,636 | B2 | 5/2004 | Lielbriedis |
| 6,748,057 | B2 | 6/2004 | Ranalli et al. |
| 6,775,737 | B1 | 8/2004 | Warkhede et al. |
| 6,795,546 | B2 | 9/2004 | Delaney et al. |
| 6,795,701 | B1 | 9/2004 | Hui et al. |
| 6,819,652 | B1 | 11/2004 | Akhtar et al. |
| 6,836,477 | B1 | 12/2004 | West, Jr. et al. |
| 6,839,421 | B2 | 1/2005 | Ferraro Esparza et al. |
| 6,865,153 | B1 | 3/2005 | Hill et al. |
| 6,871,070 | B2 | 3/2005 | Ejzak |
| 6,885,872 | B2 | 4/2005 | McCann et al. |
| 6,915,345 | B1 | 7/2005 | Tummala et al. |
| 6,917,612 | B2 | 7/2005 | Foti et al. |
| 6,918,041 | B1 | 7/2005 | Chen |
| 6,950,441 | B1 | 9/2005 | Kaczmarczyk et al. |
| 6,954,790 | B2 | 10/2005 | Forslöw |
| 6,967,956 | B1 | 11/2005 | Tinsley et al. |
| 6,993,038 | B2 | 1/2006 | McCann |
| 7,010,002 | B2 | 3/2006 | Chow et al. |
| 7,027,433 | B2 | 4/2006 | Tuohino et al. |
| 7,027,582 | B2 | 4/2006 | Khello et al. |
| 7,035,239 | B2 | 4/2006 | McCann et al. |
| 7,039,037 | B2 | 5/2006 | Wang et al. |
| 7,042,877 | B2 | 5/2006 | Foster et al. |
| 7,043,000 | B2 | 5/2006 | Delaney et al. |
| 7,054,652 | B2 | 5/2006 | Luis |
| 7,079,499 | B1 | 7/2006 | Akhtar et al. |
| 7,079,524 | B2 | 7/2006 | Bantukul et al. |
| 7,079,853 | B2 | 7/2006 | Rathnasabapathy et al. |
| 7,085,260 | B2 | 8/2006 | Karaul et al. |
| 7,092,505 | B2 | 8/2006 | Allison et al. |
| 7,107,041 | B1 | 9/2006 | O'Driscoll |
| 7,136,635 | B1 | 11/2006 | Bharatia et al. |
| 7,170,982 | B2 | 1/2007 | Li et al. |
| 7,221,952 | B2 | 5/2007 | Cho et al. |
| 7,257,636 | B2 | 8/2007 | Lee et al. |
| 7,286,516 | B2 | 10/2007 | Delaney et al. |
| 7,286,839 | B2 | 10/2007 | McCann et al. |
| 7,292,592 | B2 | 11/2007 | Rune |
| 7,298,725 | B2 | 11/2007 | Rune |
| 7,333,438 | B1 | 2/2008 | Rabie et al. |
| 7,333,482 | B2 | 2/2008 | Johansson et al. |
| 7,366,530 | B2 | 4/2008 | McCann et al. |
| 7,383,298 | B2 | 6/2008 | Palmer et al. |
| 7,397,773 | B2 | 7/2008 | Qu et al. |
| 7,403,492 | B2 | 7/2008 | Zeng et al. |
| 7,403,537 | B2 | 7/2008 | Allison et al. |
| 7,415,007 | B2 | 8/2008 | Huang |
| 7,466,807 | B2 | 12/2008 | McCann et al. |
| 7,551,608 | B1 | 6/2009 | Roy |
| 7,567,796 | B2 | 7/2009 | Tammi et al. |
| 7,583,963 | B2 | 9/2009 | Tammi et al. |
| 7,590,732 | B2 | 9/2009 | Rune |
| 7,633,872 | B2 | 12/2009 | Pitcher et al. |
| 7,633,969 | B2 | 12/2009 | Caugherty et al. |
| 7,706,343 | B2 | 4/2010 | Delaney et al. |
| 7,756,518 | B2 | 7/2010 | Xu et al. |
| 7,787,445 | B2 | 8/2010 | Marsico |
| 7,792,981 | B2 | 9/2010 | Taylor |
| 7,822,023 | B2 | 10/2010 | Lahetkangas et al. |
| 7,889,716 | B2 | 2/2011 | Tejani et al. |
| 7,894,353 | B2 | 2/2011 | Li et al. |
| 7,898,957 | B2 | 3/2011 | Lea et al. |
| 7,916,685 | B2 | 3/2011 | Schaedler et al. |
| 7,961,685 | B2 | 6/2011 | Suh et al. |
| 7,996,007 | B2 | 8/2011 | Bantukul |
| 7,996,541 | B2 | 8/2011 | Marathe et al. |
| 8,041,021 | B2 | 10/2011 | Xu et al. |
| 8,045,983 | B2 | 10/2011 | Bantukul |
| 8,170,035 | B2 | 5/2012 | Furey et al. |
| 8,170,055 | B2 | 5/2012 | Fang et al. |
| 8,219,697 | B2 | 7/2012 | Langen et al. |
| 8,223,658 | B2 | 7/2012 | Bahr |
| 8,359,015 | B2 | 1/2013 | Swaminathan et al. |
| 8,452,325 | B2 | 5/2013 | McCann |
| 8,468,267 | B2 | 6/2013 | Yigang et al. |
| 8,478,828 | B2 | 7/2013 | Craig et al. |
| 8,483,233 | B2 | 7/2013 | Craig et al. |

(56) References Cited

U.S. PATENT DOCUMENTS

| | | |
|---|---|---|
| 8,498,202 B2 | 7/2013 | Kanode et al. |
| 8,504,630 B2 | 8/2013 | Craig et al. |
| 8,527,598 B2 | 9/2013 | Craig et al. |
| 8,532,110 B2 | 9/2013 | McCann et al. |
| 8,538,000 B2 | 9/2013 | Bantukul et al. |
| 8,554,928 B2 | 10/2013 | Craig et al. |
| 8,578,050 B2 | 11/2013 | Craig et al. |
| 8,594,679 B2 | 11/2013 | Agarwal et al. |
| 8,601,073 B2 | 12/2013 | Craig et al. |
| 8,613,073 B2 | 12/2013 | McCann et al. |
| 8,644,324 B2 | 2/2014 | Kanode et al. |
| 8,750,126 B2 | 6/2014 | McCann et al. |
| 8,792,329 B2 | 7/2014 | Kanode et al. |
| 8,799,391 B2 | 8/2014 | Craig et al. |
| 2001/0024443 A1 | 9/2001 | Alriksson et al. |
| 2001/0030957 A1 | 10/2001 | McCann et al. |
| 2001/0040957 A1 | 11/2001 | McCann et al. |
| 2002/0049901 A1 | 4/2002 | Carvey |
| 2002/0051427 A1 | 5/2002 | Carvey |
| 2002/0054674 A1 | 5/2002 | Chang et al. |
| 2002/0069278 A1 | 6/2002 | Forslöw |
| 2002/0087723 A1 | 7/2002 | Williams et al. |
| 2002/0133494 A1 | 9/2002 | Goedken |
| 2002/0133534 A1 | 9/2002 | Forslow |
| 2002/0141346 A1 | 10/2002 | Garcia-Luna-Aceves et al. |
| 2002/0147845 A1 | 10/2002 | Sanchez-Herrero et al. |
| 2002/0173320 A1 | 11/2002 | Aitken et al. |
| 2002/0176382 A1 | 11/2002 | Madour et al. |
| 2002/0181507 A1 | 12/2002 | Jones |
| 2003/0007482 A1 | 1/2003 | Khello et al. |
| 2003/0013464 A1 | 1/2003 | Jean Henry-Labordere |
| 2003/0026289 A1 | 2/2003 | Mukherjee et al. |
| 2003/0054844 A1 | 3/2003 | Anvekar et al. |
| 2003/0065788 A1 | 4/2003 | Salomaki |
| 2003/0081754 A1 | 5/2003 | Esparza et al. |
| 2003/0095536 A1 | 5/2003 | Hu et al. |
| 2003/0109271 A1 | 6/2003 | Lewis et al. |
| 2003/0115358 A1 | 6/2003 | Yun |
| 2003/0128693 A1 | 7/2003 | Segal |
| 2003/0181206 A1 | 9/2003 | Zhou et al. |
| 2003/0193967 A1 | 10/2003 | Fenton et al. |
| 2003/0225938 A1 | 12/2003 | Glasco et al. |
| 2003/0227899 A1 | 12/2003 | McCann |
| 2004/0003114 A1 | 1/2004 | Adamczyk |
| 2004/0034699 A1 | 2/2004 | Gotz et al. |
| 2004/0037278 A1 | 2/2004 | Wong et al. |
| 2004/0042485 A1 | 3/2004 | Gettala et al. |
| 2004/0053604 A1 | 3/2004 | Ratilainen et al. |
| 2004/0053610 A1 | 3/2004 | Kim |
| 2004/0076126 A1 | 4/2004 | Qu et al. |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0098612 A1 | 5/2004 | Lee et al. |
| 2004/0125925 A1 | 7/2004 | Marsot |
| 2004/0142707 A1 | 7/2004 | Midkiff et al. |
| 2004/0196963 A1 | 10/2004 | Appelman et al. |
| 2004/0198351 A1 | 10/2004 | Knotts |
| 2004/0202187 A1 | 10/2004 | Kelly et al. |
| 2004/0246965 A1 | 12/2004 | Westman et al. |
| 2005/0002417 A1 | 1/2005 | Kelly et al. |
| 2005/0099964 A1 | 5/2005 | Delaney et al. |
| 2005/0100145 A1 | 5/2005 | Spencer et al. |
| 2005/0119017 A1 | 6/2005 | Lovell, Jr. et al. |
| 2005/0143075 A1 | 6/2005 | Halsell |
| 2005/0180438 A1 | 8/2005 | Ko et al. |
| 2005/0232236 A1 | 10/2005 | Allison et al. |
| 2005/0232407 A1 | 10/2005 | Craig et al. |
| 2005/0235065 A1 | 10/2005 | Le et al. |
| 2005/0246545 A1 | 11/2005 | Reiner |
| 2005/0246716 A1 | 11/2005 | Smith et al. |
| 2005/0286531 A1 | 12/2005 | Tuohino et al. |
| 2006/0002308 A1 | 1/2006 | Na et al. |
| 2006/0002400 A1 | 1/2006 | Kenyon et al. |
| 2006/0034256 A1 | 2/2006 | Addagatla et al. |
| 2006/0045249 A1 | 3/2006 | Li et al. |
| 2006/0067338 A1 | 3/2006 | Hua et al. |
| 2006/0072726 A1 | 4/2006 | Klein et al. |
| 2006/0077957 A1 | 4/2006 | Reddy et al. |
| 2006/0095575 A1 | 5/2006 | Sureka et al. |
| 2006/0098621 A1 | 5/2006 | Plata Andres et al. |
| 2006/0101159 A1 | 5/2006 | Yeh et al. |
| 2006/0104210 A1 | 5/2006 | Nielsen |
| 2006/0123477 A1 | 6/2006 | Raghavan et al. |
| 2006/0136557 A1 | 6/2006 | Schaedler et al. |
| 2006/0177007 A1 | 8/2006 | Vaghar et al. |
| 2006/0200670 A1 | 9/2006 | Kuffel et al. |
| 2006/0221972 A1 | 10/2006 | Bhargava et al. |
| 2006/0225128 A1 | 10/2006 | Aittola et al. |
| 2006/0253563 A1 | 11/2006 | Yang et al. |
| 2006/0293021 A1 | 12/2006 | Zhou |
| 2007/0019625 A1 | 1/2007 | Ramachandran et al. |
| 2007/0047539 A1 | 3/2007 | Agarwal et al. |
| 2007/0061397 A1 | 3/2007 | Gregorat et al. |
| 2007/0076600 A1 | 4/2007 | Ekl et al. |
| 2007/0115934 A1 | 5/2007 | Dauster et al. |
| 2007/0116250 A1 | 5/2007 | Stafford |
| 2007/0121879 A1 | 5/2007 | McGary et al. |
| 2007/0129059 A1 | 6/2007 | Nadarajah et al. |
| 2007/0133757 A1 | 6/2007 | Girouard et al. |
| 2007/0153995 A1 | 7/2007 | Fang et al. |
| 2007/0168421 A1 | 7/2007 | Kalyanpur et al. |
| 2007/0168428 A1 | 7/2007 | Clift et al. |
| 2007/0191003 A1 | 8/2007 | Smith et al. |
| 2007/0195751 A1 | 8/2007 | Cai et al. |
| 2007/0214209 A1 | 9/2007 | Maeda |
| 2007/0238465 A1 | 10/2007 | Han et al. |
| 2007/0243876 A1 | 10/2007 | Duan |
| 2007/0280447 A1 | 12/2007 | Cai et al. |
| 2008/0025230 A1 | 1/2008 | Patel et al. |
| 2008/0037759 A1 | 2/2008 | Chin et al. |
| 2008/0043614 A1 | 2/2008 | Soliman |
| 2008/0084975 A1 | 4/2008 | Schwartz |
| 2008/0109532 A1 | 5/2008 | Denoual et al. |
| 2008/0112399 A1 | 5/2008 | Cohen et al. |
| 2008/0114862 A1 | 5/2008 | Moghaddam et al. |
| 2008/0130856 A1 | 6/2008 | Ku et al. |
| 2008/0144602 A1 | 6/2008 | Casey |
| 2008/0167035 A1 | 7/2008 | Buckley et al. |
| 2008/0171544 A1 | 7/2008 | Li et al. |
| 2008/0212576 A1 | 9/2008 | O'Neill |
| 2008/0247526 A1 | 10/2008 | Qiu et al. |
| 2008/0281975 A1 | 11/2008 | Qiu et al. |
| 2008/0301162 A1 | 12/2008 | Wall et al. |
| 2008/0311917 A1 | 12/2008 | Marathe et al. |
| 2008/0317247 A1 | 12/2008 | Jeong et al. |
| 2009/0022146 A1 | 1/2009 | Huang |
| 2009/0043704 A1 | 2/2009 | Bantukul et al. |
| 2009/0080440 A1 | 3/2009 | Balyan et al. |
| 2009/0083861 A1 | 3/2009 | Jones |
| 2009/0103707 A1 | 4/2009 | McGary et al. |
| 2009/0138619 A1 | 5/2009 | Schnizlein et al. |
| 2009/0185494 A1 | 7/2009 | Li et al. |
| 2009/0193071 A1* | 7/2009 | Qiu et al. ................. 709/203 |
| 2009/0227276 A1 | 9/2009 | Agarwal et al. |
| 2009/0264096 A1* | 10/2009 | Cai et al. ................. 455/406 |
| 2009/0264112 A1 | 10/2009 | De Zen et al. |
| 2009/0265467 A1 | 10/2009 | Peles |
| 2009/0319686 A1 | 12/2009 | Watanabe |
| 2010/0017846 A1 | 1/2010 | Huang et al. |
| 2010/0020728 A1 | 1/2010 | Jefferson et al. |
| 2010/0042525 A1* | 2/2010 | Cai et al. ................. 705/35 |
| 2010/0135287 A1 | 6/2010 | Hosain et al. |
| 2010/0177780 A1 | 7/2010 | Ophir et al. |
| 2010/0251330 A1 | 9/2010 | Kroeselberg et al. |
| 2010/0265948 A1 | 10/2010 | Patel et al. |
| 2010/0285800 A1 | 11/2010 | McCann |
| 2010/0299451 A1* | 11/2010 | Yigang et al. ................. 709/241 |
| 2010/0304710 A1* | 12/2010 | Sharma et al. ................. 455/406 |
| 2011/0060830 A1 | 3/2011 | Kang et al. |
| 2011/0126277 A1 | 5/2011 | McCann et al. |
| 2011/0188397 A1 | 8/2011 | McCann et al. |
| 2011/0199895 A1 | 8/2011 | Kanode et al. |
| 2011/0199906 A1 | 8/2011 | Kanode et al. |

(56) References Cited

U.S. PATENT DOCUMENTS

| | | | |
|---|---|---|---|
| 2011/0200047 A1 | 8/2011 | McCann et al. |
| 2011/0200053 A1 | 8/2011 | Kanode et al. |
| 2011/0200054 A1 | 8/2011 | Craig et al. |
| 2011/0202604 A1 | 8/2011 | Craig et al. |
| 2011/0202612 A1 | 8/2011 | Craig et al. |
| 2011/0202613 A1 | 8/2011 | Craig et al. |
| 2011/0202614 A1 | 8/2011 | Craig et al. |
| 2011/0202676 A1 | 8/2011 | Craig et al. |
| 2011/0202677 A1 | 8/2011 | Craig et al. |
| 2011/0202684 A1 | 8/2011 | Craig et al. |
| 2011/0225281 A1 | 9/2011 | Riley et al. |
| 2011/0314178 A1 | 12/2011 | Kanode et al. |
| 2013/0039176 A1 | 2/2013 | Kanode et al. |
| 2013/0346549 A1 | 12/2013 | Craig et al. |
| 2014/0074975 A1 | 3/2014 | Craig et al. |
| 2014/0181952 A1 | 6/2014 | McCann et al. |
| 2014/0226495 A1 | 8/2014 | Kanode et al. |

FOREIGN PATENT DOCUMENTS

| | | | |
|---|---|---|---|
| CN | 1968267 A | | 5/2007 |
| CN | 101150512 A | | 3/2008 |
| CN | 101151861 A | | 3/2008 |
| CN | 101252788 A | | 8/2008 |
| CN | 101494608 A | | 7/2009 |
| CN | 101588606 A | | 11/2009 |
| CN | ZL 200680051295 | | 3/2013 |
| EP | 0 512 962 A2 | | 11/1992 |
| EP | 0 936 825 A3 | | 8/1999 |
| EP | 0 944 276 A1 | | 9/1999 |
| EP | 1 134 939 A1 | | 9/2001 |
| EP | 1 328 102 A1 | | 7/2003 |
| EP | 1 285 545 B1 | | 10/2004 |
| EP | 1 465 385 A1 | | 10/2004 |
| EP | 1 247 378 B1 | | 5/2005 |
| EP | 1 558 004 A | | 7/2005 |
| EP | 1 252 788 B1 | | 8/2006 |
| EP | 1 742 452 A1 | | 1/2007 |
| EP | 1 314 324 B1 | | 8/2008 |
| EP | 1 847 076 B1 | | 2/2012 |
| EP | 1 958 399 B1 | | 2/2012 |
| KP | 10-2004-0107271 A | | 12/2004 |
| KR | 2000-0037801 | | 7/2000 |
| KR | 10-1998-0052565 | | 5/2001 |
| KR | 2003-0040291 A1 | | 5/2003 |
| WO | WO 95/12292 A1 | | 5/1995 |
| WO | WO 96/11557 | | 4/1996 |
| WO | WO 97/33441 A1 | | 9/1997 |
| WO | WO 98/18269 | | 4/1998 |
| WO | WO 98/56195 | | 12/1998 |
| WO | WO 99/11087 A2 | | 3/1999 |
| WO | WO 99/57926 | | 11/1999 |
| WO | WO 00/16583 A1 | | 3/2000 |
| WO | WO 00/60821 | | 10/2000 |
| WO | WO 01/47297 A2 | | 6/2001 |
| WO | WO 01/48981 A1 | | 7/2001 |
| WO | WO 01/54444 A1 | | 7/2001 |
| WO | WO 03/003653 A2 | | 1/2003 |
| WO | WO 03/005664 A2 | | 1/2003 |
| WO | WO 03/021982 A1 | | 3/2003 |
| WO | WO 03/105382 A1 | | 12/2003 |
| WO | WO 2004/006534 A1 | | 1/2004 |
| WO | WO 2004/008786 A1 | | 1/2004 |
| WO | WO 2004/075507 A2 | | 9/2004 |
| WO | WO 2004/102345 A2 | | 11/2004 |
| WO | WO 2005/013538 A2 | | 2/2005 |
| WO | WO 2006/072473 A1 | | 7/2006 |
| WO | WO 2007/045991 A1 | | 4/2007 |
| WO | WO 2007/064943 A2 | | 6/2007 |
| WO | WO 2008/011101 A2 | | 1/2008 |
| WO | WO 2008/087633 A2 | | 7/2008 |
| WO | WO 2008/144927 A1 | | 12/2008 |
| WO | WO 2008/157213 A2 | | 12/2008 |
| WO | WO 2009/023573 A2 | | 2/2009 |
| WO | WO 2009/058067 A1 | | 5/2009 |
| WO | WO 2009/070179 A1 | | 6/2009 |
| WO | WO 2009/134265 A1 | | 11/2009 |
| WO | WO 2011/100587 A2 | | 8/2011 |
| WO | WO 2011/100594 A2 | | 8/2011 |
| WO | WO 2011/100600 A2 | | 8/2011 |
| WO | WO 2011/100603 A2 | | 8/2011 |
| WO | WO 2011/100606 A2 | | 8/2011 |
| WO | WO 2011/100609 A2 | | 8/2011 |
| WO | WO 2011/100610 A2 | | 8/2011 |
| WO | WO 2011/100612 A2 | | 8/2011 |
| WO | WO 2011/100615 A2 | | 8/2011 |
| WO | WO 2011/100621 A2 | | 8/2011 |
| WO | WO 2011/100626 A2 | | 8/2011 |
| WO | WO 2011/100629 A2 | | 8/2011 |
| WO | WO 2011/100630 A2 | | 8/2011 |

OTHER PUBLICATIONS

Notice of Allowance and Fee(s) Due for U.S. Appl. No. 11/888,907 (Apr. 1, 2011).

Official Action for U.S. Appl. No. 11/982,549 (Feb. 24, 2011).

Chinese Official Action for Chinese Patent Application No. 200680051295.9 (Dec. 24, 2010).

Notification of Transmittal of the International Search Report and the Written Opinion of the International Searching Authority, or the Declaration for International Application No. PCT/US2010/034372 (Nov. 30, 2010)

Notice of Allowance and Fee(s) Due for U.S. Appl. No. 11/291,502 (Oct. 5, 2010).

Official Action for U.S. Appl. No. 11/888,907 (Sep. 16, 2010).

Communication pursuant to Article 94(3) EPC for European Application No. 07810606.9 (Aug. 26, 2010).

Communication pursuant to Article 94(3) EPC for European Application No. 03734522.0 (Aug. 19, 2010).

Tsou et al., "Realm-Based Redirection in Diameter," draft-ietf-dime-realm-based-redirect-03, RFC 3588, pp. 1-6 (Jul. 12, 2010).

Communication Pursuant to Article 94(3) EPC for European Application No. 06844747.3 (May 11, 2010).

Notice of Allowance and Fee(s) Due for U.S. Appl. No. 11/879,737 (Apr. 22, 2010).

Supplemental European Search Report for European Application No. 03734522.0 (Feb. 23, 2010).

Communication pursuant to Article 94(3) EPC for European Application No. 07810606.9 (Feb. 12, 2010).

Final Official Action for U.S. Appl. No. 11/291,502 (Feb. 4, 2010).

Supplementary European Search Report for European Application No. 07810606.9 (Nov. 23, 2009).

Supplementary European Search Report for European Patent No. 1676386 (Oct. 30, 2009).

Notification of Transmittal of the International Search Report and the Written Opinion of the International Searching Authority, or the Declaration for International Application No. PCT/US2009/036538 (Sep. 30, 2009).

Non-Final Official Action for U.S. Appl. No. 11/879,737 (Sep. 30, 2009).

"3$^{rd}$ Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 9)," 3GPP TS 29.272, V9.0.0, pp. 1-71 (Sep. 2009).

Supplementary European Search Report for European Application No. 04751843.6 (Aug. 7, 2009).

Communication pursuant to Article 94(3) EPC for European Application No. 06844747.3 (Jul. 28, 2009).

Final Official Action for U.S. Appl. No. 11/879,737 (Jun. 9, 2009).

Official Action for U.S. Appl. No. 11/291,502 (May 13, 2009).

Supplementary European Search Report for European Application No. 06844747.3 (Apr. 24, 2009).

Communication of European publication number and information on the application of Article 67(3) EPC for European Application No. 07810606.9 (Mar. 18, 2009).

(56) References Cited

OTHER PUBLICATIONS

Notification of Transmittal of the International Search Report and the Written Opinion of the International Searching Authority, or the Declaration for International Application No. PCT/US2008/072641 (Feb. 24, 2009).
Communication of European publication number and information on the application of Article 67(3) EPC for European Application No. 07809476.0 (Feb. 11, 2009).
Notification of Transmittal of the International Search Report and the Written Opinion of the International Searching Authority, or the Declaration for International Application No. PCT/US2008/066675 (Dec. 9, 2008).
Notification Concerning Transmittal of International Preliminary Report on Patentability for International Application No. PCT/US2006/046108 (Oct. 2, 2008).
Notification of Transmittal of the International Search Report and the Written Opinion of the International Searching Authority, or the Declaration for International Application No. PCT/US07/16370 (Sep. 15, 2008).
Official Action for U.S. Appl. No. 11/879,737 (Sep. 15, 2008).
Notification of Transmittal of the International Search Report and the Written Opinion of the International Searching Authority, or the Declaration for International Application No. PCT/US2006/046108 (Sep. 9, 2008).
Communication of European publication number and information on the application of Article 67(3) EPC for Application No. 06844747.3 (Jul. 23, 2008).
Notice of Allowance and Fee(s) Due for U.S. Appl. No. 11/112,126 (Mar. 28, 2008).
"3rd Generation Partnership Project; Technical Specification Group Services and System Aspects; Policy and charging control architecture (Release 8)," Specification Group 3GPP TS 23.203, V8.1.1, pp. 1-87 (Mar. 2008).
Notice of Allowance and Fee(s) Due for U.S. Appl. No. 11/112,126 (Dec. 17, 2007).
Notice of Allowance for U.S. Appl. No. 10/729,519 (Jul. 30, 2007).
Official Action for U.S. Appl. No. 11/112,126 (Jun. 15, 2007).
"IP Multimedia Subsystem," printout from wikipedia.org, Wikimedia Foundation, Inc. (May 29, 2007).
Official Action for U.S. Appl. No. 10/729,519 (Nov. 28, 2006).
Notification Concerning Transmittal of International Preliminary Report on Patentability for International Application No. PCT/US2004/024328 (Jul. 20, 2006).
"HP OperCall Home Subscriber Server Software—Data Sheet", 4AA0-3360ENW Rev. 2, Hewlett-Packard Development Company, L.P. (Jul. 2006).
Notice of Allowance for U.S. Appl. No. 10/631,586 (May 25, 2006).
Notification of Transmittal of the International Search Report, or the Declaration and Written Opinion of the International Searching Authority for International Application No. PCT/US2004/024328 (Apr. 25, 2006).
Supplemental Notice of Allowance for U.S. Appl. No. 09/747,070 (Feb. 10, 2006).
Notification of European publication number and information on the application of Article 67(3) EPC for European Application No. 04751843.6 (Dec. 29, 2005).
Communication pursuant to Rules 109 and 110 EPC for European Application No. 04751843.6 (Dec. 16, 2005).
Notice of Allowance for U.S. Appl. No. 09/747,070 (Dec. 2, 2005).
Interview Summary for U.S. Appl. No. 09/747,070 (Dec. 2, 2005).
Notification Concerning Transmittal of International Preliminary Report on Patentability (Chapter I of the Patent Cooperation Treaty) in International Application No. PCT/US2004/014645 (Nov. 24, 2005).
Advisory Action for U.S. Appl. No. 09/747,070 (Nov. 1, 2005).
Official Action for U.S. Appl. No. 10/631,586 (Oct. 26, 2005).
Notice of Allowance for U.S. Appl. No. 10/166,968 (Sep. 20, 2005).
Final Official Action for U.S. Appl. No. 09/747,070 (May 11, 2005).
Notification of European Publication Number and Information on the Application of 67(3) EPC for European Article No. 03734522.0 (Mar. 23, 2005).
Supplemental Notice of Allowance and Fee(s) Due for U.S. Appl. No. 10/842,394 (Feb. 9, 2005).
Jones, "The Definitive Guide to Scaling Out SQL Server," http://www.snip.gob.ni/Xdc/SQL/DGSOSSFinal.pdf (Retrieved on Aug. 16, 2010)(2005).
Notification of Transmittal of the International Search Report and the Written Opinion of the International Searching Authority, or the Declaration for International Application No. PCT/US2004/014645 (Dec. 16, 2004).
Notice of Allowance and Fee(s) Due for U.S. Appl. No. 10/842,394 (Dec. 15, 2004).
Notification of Transmittal of the International Search Report and the Written Opinion of the International Searching Authority, or the Declaration for International Application No. PCT/US04/06247 (Nov. 10, 2004).
Notice of Allowance for U.S. Appl. No. 09/471,946 (Oct. 15, 2004).
Official Action for U.S. Appl. No. 09/747,070 (Jun. 30, 2004).
Supplemental Notice of Allowability for U.S. Appl. No. 09/471,946 (May 24, 2004).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Notice of Allowance and Fee(s) Due for U.S. Appl. No. 09/471,946 (Feb. 6, 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Interview Summary for U.S. Appl. No. 09/471,946 (Dec. 9, 2003).
Communication pursuant to Article 96(2) EPC for European Application No. 00988270.5 (Nov. 12, 2003).
Notification of Transmittal of the International Search Report or the Declaration for International Application No. PCT/US2003/018266 (Oct. 31, 2003).
Office Communication for U.S. Appl. No. 09/759,743 (Oct. 20, 2003).
Official Action for U.S. Appl. No. 09/471,946 (Jul. 9, 2003).
Moodie, "Agilent acceSS7: White Paper," Agilent Technologies, pp. 1-14 (Apr. 1, 2003).
Notice of Allowance and Fee(s) Due for U.S. Appl. No. 09/759,743 (Mar. 10, 2003).
Interview Summary for U.S. Appl. No. 09/759,743 (Feb. 27, 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP MAP Gateway for Public WLAN Slm Authentication and Authorization," Cisco Systems, Inc., pp. 1-13 (Copyright 1992-2003).
Final Official Action for U.S. Appl. No. 09/759,743 (Dec. 2, 2002).
Barry, "A Signal for Savings," Packet, Cisco Systems Users Magazine, vol. 14, No. 4, pp. Cover; 19-21; and 81 (Fourth Quarter 2002).
Interview Summary for U.S. Appl. No. 09/759,743 (Sep. 13, 2002).
Official Action for U.S. Appl. No. 09/759,749 (May 23, 2002).
Interview Summary for U.S. Appl. No. 09/759,743 (Mar. 6, 2002).
"Agilent Technologies and Cisco Systems SS7 Over IP White Paper," Cisco Systems, Inc. and Agilent and Technologies, pp. 1-6 (Copyright 2002-Printed in the UK Feb. 1, 2002).

(56) References Cited

OTHER PUBLICATIONS

"Cisco IP Transfer Point: MTP3 User Adaptation (M3UA) and SCCP User Adaptation (SUA) Signalling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
Notification of Transmittal of International Preliminary Examination Report for International Application No. PCT/US1999/030861 (Dec. 28, 2001).
Official Action for U.S. Appl. No. 09/759,743 (Dec. 3, 2001).
International Preliminary Examination Report for International Application No. PCT/US01/01052 (Nov. 7, 2001).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001-Printed in the UK Nov. 30, 2001).
International Search Report for International Application No. PCT/US00/34924 (May 16, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Rockhold, "Or," Wireless Review, p. 22, 23, 26, 28, 30, 32, (Aug. 15, 2000).
Notification of Transmittal of the International Search Report or the Declaration for International Application No. PCT/US1999/030861 (Mar. 17, 2000).
"Topsail Beach-SS7 Over IP-" Cisco Systems, Inc., pp. 1-16 (Copyright 1999).
ETSI, "Digital Cellular Telecommunications Systems (Phase 2+); Support of Mobile Number Portability (MNP); Technical Realisation; Stage 2," Global System for Mobile Communications, p. 1-71, (1998).
Smith, "Number Portability Pileup," Telephony, p. 22, 24, 26, (Jan. 6, 1997).
Jain et al., "Phone Number Portability for PCS Systems with ATM Backbones Using Distributed Dynamic Hashing," IEEE, vol. 15 (No. 1), p. 96-105, (Jan. 1997).
Heinmiller, "Generic Requirements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7-Signalling Connection Control Part," p. 11-16, (Jul. 1996).
Rice, "SS7 Networks in a PCS World," Telephony, pp. 138, 140 142, 144, 146 (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for Number Portability," AT&T Network Systems, No. 1, p. 1-75, (Feb. 2, 1996).
ETSI, Digital Cellular Telecommunications System (Phase 2+); Milbe Applicaton Part (MAP) Specification, Global System for Mobile Communications, pp. 112-114 (1996).
Jain, et al., "A Hashing Scheme for Phone Number Portability in PCS Systems with ATM Backbones," Bell Communications Research, p. 593-597, (1996).
Bishop, "Freeing the Network for Competition," Telecommunications, p. 75-80, (Apr. 1995).
Anonymous, "Zeichengabesysteme-Eine neue Generation für ISDN und intelligente Netze," Zeichengabesystem, Medien-Institut Bremen, p. iz-xi; 170-176, (Feb. 17, 1995).
Giordano et al., "PCS Number Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).
Telcordia Technologies, "CCS Network Interface Specification (CCSNIS) Supporting SCCP and TCAP," Bell Communications Research, p. ii-xii, 1-1—C-22, (Mar. 1994).
Buckles, "Very High Capacity Signaling Trnsfer Point for Network Services," DSC Communitations Corporation, p. 1308-1311, (1988).
Communication under Rule 71(3) EPC for European Application No. 06 844 747.3 (Jul. 19, 2011).
Notice of Allowance and Fee(s) Due for U.S. Appl. No. 11/605,837 (Jan. 20, 2012).
Decision to Grant a European Patent Pursuant to Article 97(1) EPC for European Patent Application No. 06844747.3 (Jan. 19, 2012).
Communication Pursuant to Article 94(3) EPC for Eurpoean Patent Application No. 04751843.6. (Dec. 15, 2011).
Final Official Action for U.S. Appl. No. 11/635,406 (Nov. 30, 2011).
Interview Summary for U.S. Appl. No. 11/982,549 (Nov. 28, 2011).
Notification of Transmittal of the International Search Report and the Written Opinion of the International Searching Authority, or the Declaration for International Application No. PCT/US2011/024622 (Oct. 31, 2011).
Notification of Transmittal of the International Search Report and the Written Opinion of the International Searching Authority, or the Declaration for International Application No. PCT/US2011/024617 (Oct. 31, 2011).
Notification of Transmittal of the International Search Report and the Written Opinion of the International Searching Authority, or the Declaration for International Application No. PCT/US2011/024614 (Oct. 31, 2011).
Notification of Transmittal of the International Search Report and the Written Opinion of the International Searching Authority, or the Declaration for International Application No. PCT/US2011/024646 (Oct. 28, 2011).
Notification of Transmittal of the International Search Report and the Written Opinion of the International Searching Authority, or the Declaration for International Application No. PCT/US2011/024645 (Oct. 28, 2011).
Notification of Transmittal of the International Search Report and the Written Opinion of the International Searching Authority, or the Declaration for International Application No. PCT/US2011/024642 (Oct. 28, 2011).
Notification of Transmittal of the International Search Report and the Written Opinion of the International Searching Authority, or the Declaration for International Application No. PCT/US2011/024621 (Oct. 28, 2011).
Notification of Transmittal of the International Search Report and the Written Opinion of the International Searching Authority, or the Declaration for International Application No. PCT/US2011/024637 (Oct. 27, 2011).
Notification of Transmittal of the International Search Report and the Written Opinion of the International Searching Authority, or the Declaration for International Application No. PCT/US2011/024629 (Oct. 27, 2011).
Notification of Transmittal of the International Search Report and the Written Opinion of the International Searching Authority, or the Declaration for International Application No. PCT/US2011/024625 (Oct. 25, 2011).
Notification of Transmittal of the International Search Report and the Written Opinion of the International Searching Authority, or the Declaration for International Application No. PCT/US2011/024611 (Oct. 20, 2011).
Notification of Transmittal of the International Search Report and the Written Opinion of the International Searching Authority, or the Declaration for International Application No. PCT/US2011/024601 (Oct. 20, 2011).
Notification of Transmittal of the International Search Report and the Written Opinion of the International Searching Authority, or the Declaration for International Application No. PCT/US2011/024588 (Oct. 20, 2011).
Second Office Action for Chinese Patent Application No. 200680051295.9 (Oct. 9, 2011).

(56) References Cited

OTHER PUBLICATIONS

Notice of Panel Decision from Pre-Appeal Brief Review for U.S. Appl. No. 11/635,406 (Oct. 3, 2011).
Notification of Transmittal of the International Search Report and the Written Opinion of the International Searching Authority, or the Declaration for International Application No. PCT/US2010/053062 (Jun. 28, 2011).
Notice of Publication of Abstract for Indian Patent Application No. 6406/CHENP/2010 A (Jun. 17, 2011).
Znaty, "Diameter, GPRS, (LTE + ePC = EPS), IMS, PCC and SDM," EFORT (May 2010). (Part 1 of 2, pp. 1-229).
Znaty, "Diameter, GPRS, (LTE + ePC = EPS), IMS, PCC and SDM," EFORT (May 2010). (Part 2 of 2, pp. 230-460).
"Ericsson Unified Number Portability," (Downloaded from the Internet on Jan. 24, 2011).
"3rd Generation Partnership Project; Technical Specification Group Core Network and Terminals; Policy and Charging Control signalling flows and Quality of Service (QoS) parameter mapping (Release 9)," 3GPP TS 29.213, V9.2.0, pp. 1-129 (Mar. 2010).
"Traffix Diameter Getaway; Instant Diameter connection to any Network Element," Traffix Systems, pp. 1-4 (Publication Date Unknown) (Downloaded from the Internet on Feb. 8, 2010).
"Traffix Diameter Load Balancer; Scaling the Diameter Control Plane," Traffix Systems, pp. 1-4 (Publication Date Unknow) (Downloaded from the Internet on Feb. 8, 2010).
"Next Generation Networks Load Balancing—The Key to NGN Control, Management, and Growth," Whitepaper by Traffix Systems, pp. 1-7 (Publicaton Date Unknown) (Downloaded from the Internet on Feb. 8, 2010).
"Universal Mobile Telecommunications Systems (UMTS); LTE: InterWorking Function (IWF) Between MAP Based and Diameter Based Interfaces (3GPP TS 29.305 Version 9.0.0 Release 9)," ETSI TS 129 305 V9.0.0 (Jan. 2010).
"Digital Cellular Telecommunications System (Phase 2+); Universal Mobile Telecommunications System (UMTS); LTE; IP Multimedia (IM) Subsystem Cx and Dx Interfaces; Signalling Flows and Message Contents (3GPP TS 29.228 Version 8.7.0 Release 8)," ETSI TS 129 228 v8.7.0 (Jan. 2010).
"Mapping Diameter Interfaces to Functionality in 3GPP/3GPP2 IMS Architecture," Whitepaper by Traffix Systems, pp. 1-10 (Copyright 2010).
Jones et al., "Diameter Extended NAPTR," Individual Submission Internet-Draft, draft-ietf-dime-extended-naptr-00, pp. 1-9 (Dec. 29, 2009).
Korhonen et al., "Clarifications on the Routing of Diameter Requests Based on the Username and the Realm," RFC 5729, pp. 1-9 (Dec. 2009).
3GPP, "3rd Generation Partnership Project; Technical Specification Group Services and System Aspects; Generic Authentication Architecture (GAA); Generic Bootstrapping Architecture (Release 9)," 3GPP TS 33.220 V9.2.0 (Dec. 2009).
3GPP, "3rd Generation Partnership Project; Technical Specification Group Services and System Aspects; Telecommunication Management; Charging Management; Diameter Charging Application (Release 9)," 3GPP TS 32.299 V9.2.0 (Dec. 2009).
3GPP, "3rd Generation Partnership Project; Technical Specification Group Services and System Aspects; Telecommunication Management; Charging Management; Online Charging System (OCS); Applications and Interfaces (Release 9)," 3GPP TS 32.296 V9.1.0 (Dec. 2009).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
3GPP, "3rd Generation Partnership Project; Technical Specification Group Core Network and Terminals; Sh Interface Based on the Diameter Protocol; Protocol Details (Release 9)," 3GPP TS 29.328 V9.0.0 (Dec. 2009).
3GPP, "3rd Generation Partnership Project; Technical Specification Group Core Network and Terminals; IP Multimedia (IM) Subsystem Sh Interface; Signalling Flows Message Contents (Release 9)," 3GPP TS 29.328 V9.0.0 (Dec. 2009).
3GPP, "3rd Generation Partnership Project; Technical Specification Group Core Network and Terminals; 3GPP System to Wireless Local Area Network (WLAN) Interworking; Stage 3 (Release 9)," 3GPP TS 29.234 V9.0.0. (Dec. 2009).
3GPP, "3rd Generation Partnership Project; Technical Specification Group Core Network and Terminals; Cx and Dx Interfaces Based on the Diameter Protocol; Protocol Details (Release 9)," 3GPP TS 29.229 V9.0.0 (Dec. 2009).
3GPP, "3rd Generation Partnership Project; Technical Specification Group Core Network and Terminals; IP Multimedia (IM) Subsystem Cx and Dx Interfaces; Signalling Flows and Message Contents (Release 9)," 3GPP TS 29.228 V9.0.0 (Dec. 2009).
3GPP, "3rd Generation Partnership Project; Technical Specification Group Core Network and Terminals; Policy and Charging Control Over Rx Reference Point (Release 9)," 3GPP TS 29.214 V9.2.0 (Dec. 2009).
3GPP, "3rd Generation Partnership Project; Technical Specification Group Core Network and Terminals; Policy and Charging Control over Gx Reference Point (Release 9)," 3GPP TS 29.212 V9.1.0 (Dec. 2009).
3GPP, "3rd Generation Partnership Project; Technical Specification Group Services and System Aspects; Policy and Charging Control Architecture (Release 9)," 3GPP TS 23.203 V9.3.0 (Dec. 2009).
Jiao et al., "The Diameter Capabilities Update Application," Network Working Group Internet-Draft draft-ietf-dime-capabilities-update-01, pp. 1-8 (Dec. 1, 2009).
Tsou et al., "Realm-Based Redirection in Diameter," Internet Engineering Task Force, draft-ietf-dime-realm-based-redirect-02, pp. 1-7 (Oct. 27, 2009).
Huang et al., "The Diameter Precongestion Notification (PCN) Data Collection Applications," Network Working Group Internet-Draft <draft-huang-dime-pcn-collection-02>, pp. 1-19 (Oct. 26, 2009).
Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).
Korhonen et al., "Diameter User-Name and Realm Based Request Routing Clarifications," Diameter Maintenance and Extensions (DIME) Internet-Draft, draft-ietf-dime-nai-routing-04.txt, pp. 1-13 (Oct. 6, 2009).
Fajardo et al., "Diameter Base Protocol," DIME Internet-Draft, draft-ietf-dime-rfc3588bis-19.txt, pp. 1-160 (Sep. 2, 2009).
3GPP, "3rd Generation Partnership Project; Technical Specification Group core Network and Terminals; Generic Authentication Architecture (GAA); Zh and Zn Interfaces Based on the Diameter Protocol; Stage 3 (Release 8)," 3GPP TS 29.109 V8.3.0 (Sep. 2009).
3GPP, "3rd Generation Partnership Project; Technical Specification Group Core Network and Terminals; Numbering, Addressing and Identification (Release 8)," 3GPP TS 23.003 V8.6.0 (Sep. 2009).
Jones et al., "Diameter Extended NAPTR," Internet-Draft, draft-jones-dime-extended-naptr-00, pp. 1-8 (Aug. 23, 2009).
Korhonen et al., "Diameter User-Name and Realm Based Request Routing Clarifications," Internet-Draft, draft-ietf-dime-nai-routing-03.txt, pp. 1-11 (Aug. 19, 2009).
Tsou et al., "Session-Spectific Explicit Diameter Request Routing," Network Working Group Internet-Draft, draft-tsou-diameter-explicit-routing-03, pp. 1-18 (Aug. 5, 2009).
3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 8)," ETSI TS 129.272 V8.3.0 (Jun. 2009).
Bhardwaj, "Roaming Hubbing & LTE," GSMA London, pp. 1-11 (May 19, 2009).
3GPP, "3rd Generation Partnership Project; Technical Specification Group Core Network and Terminals; Diameter-based Protocols Usage and Recommendations in 3GPP (Release 8)," 3GPP TR 29.909 V8.1.2 (Jan. 2009).
3GPP, "3rd Generation Partnership Project; Technical Specification Group Service and System Aspects; Telecommunication Manage-

(56) References Cited

OTHER PUBLICATIONS ment; Charging Management; Charging Data Description for the IP Multimedia Subsystem (IMS) (Release 5)," 3GPP TS 32.225 V5.11.0 (Mar. 2006).
Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).
Aboba et al., "The Network Access Identifier," Network Working Group, RFC 4282, pp. 1-17 (Dec. 2005).
3GPP, "3rd Generation Partnership Project; Technical Specification Group Core Network and Terminals; Policy Control Over Go Interface (Release 6)," 3GPP TS 29.207 V6.5.0 (Sep. 2005).
Eronen et al., "Diameter Extensible Authentication Protocol (EAP) Application," Network Working Group, RFC 4072, pp. 1-31 (Aug. 2005).
Hakala et al., "Diameter Credit-Control Application," Network Working Group RFC 4006, pp. 1-107 (Aug. 2005).
Calhoun et al., "Diameter Mobile IPv4 Application," Network Working Group, RFC 4004, pp. 1-50 (Aug. 2005).
3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).
Calhoun et al., "Diameter Base Protocol," Network Working Group, RFC 3588, pp. 1-148 (Sep. 2003).
Aboba et al., "Authentication, Authorization and Account (AAA) Transport Profile," Network Working Group, RFC 3539, pp. 1-39 (Jun. 2003).
Stewart et al., "Stream Control Transmission Protocol," Network Working Group RFC 2960, pp. 1-134 (Oct. 2000).
Greene et al., "Bi-Directional Session Setup Extension to Diameter," Internet Draft <draft-greene-diameter-ss7-session-00.txt>, pbs. 1-12 (Jul. 1998).
"Diameter Overview," referenced from www.ulticom.com/html/products/signalware-diameter-reference-guide.asp (Publication Date Unknown).
Non-Final Official Action for U.S. Appl. No. 12/906,998 (Sep. 21, 2011).
Final Official Action for U.S. Appl. No. 11/982,549 (Aug. 31, 2011).
Non-Final Official Action for U.S. Appl. No. 12/400,576 (Aug. 24, 2011).
First Office Action for Chinese Patent Application No. 200780034804.1 (May 19, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.4.0, pp. 1-71 (Sep. 2009).
Tschofenig et al., "Securing the Next Steps in Signaling (NSIS) Protocol Suite," International Journal of Internet Protocol Technology, vol. 1, pp. 1-14 (2006).
Stiemerling et al., "NAT/Firewall NSIS Signaling Layer Protocol (NSLP)," draft-ietf-nsis-nslp-natfw-06, pp. 1-70 (May 16, 2005).
Calhoun et al., "Diameter Base Protocol," RFC 3588, pp. 1-90 (Sep. 2003).
Non-Final Official Action for U.S. Appl. No. 13/026,105 (May 16, 2012).
Final Official Action for U.S. Appl. No. 12/906,998 (Mar. 29, 2012).
Final Official Action for U.S. Appl. No. 12/400,576 (Mar. 9, 2012).
Advisory Action for U.S. Appl. No. 12/400,576 (Jun. 26, 2012).
Non-Final Official Action for U.S. Appl. No. 13/026,076 (Jun. 4, 2012).
Third Office Action for Chinese Patent Application No. 200680051295.9 (Mar. 20, 2012).
Notice of Allowance and Fee(s) Due for U.S. Appl. No. 11/982,549 (May 17, 2013).
Second Office Action for Chinese Application No. 200880103119.4 (Mar. 19, 2013).
Notice of Allowance and Fee(s) Due for U.S. Appl. No. 12/777,853 (Feb. 7, 2013).
First Examination Report for Indian Application No. 3231/CHENP/2008 (Jan. 2, 2013).
Non-Final Office Action for U.S. Appl. No. 12/906,998 (Jan. 2, 2013).
Communication Under Rule 71(3) EPC for European Patent Application No. 04779394.8 (Dec. 18, 2012).
Loshin, "19.4: Network Address Translation," TCP/IP Clearly Explained, Fourth Edition, Morgan Kaufman Publishers, pp. 435-437 (2003).
Restriction Requirement for U.S. Appl. No. 13/026,125 (Jun. 11, 2013).
Notice of Allowance and Fee(s) Due for U.S. Appl. No. 13/026,081 (Jun. 5, 2013).
Notice of Allowance and Fee(s) Due for U.S. Appl. No. 13/026,031 (May 30, 2013).
Interview Summary for U.S. Appl. No. 13/026,098 (May 23, 2013).
Final Office Action for U.S. Appl. No. 13/026,060 (May 10, 2013).
Notice of Allowance and Fee(s) Due for U.S. Appl. No. 13/026,144 (May 1, 2013).
Notice of Allowance and Fee(s) Due for U.S. Appl. No. 13/026,112 (Apr. 26, 2013).
Notice of Allowance and Fee(s) Due for U.S. Appl. No. 13/026,153 (Apr. 15, 2013).
Notice of Allowance and Fee(s) Due for U.S. Appl. No. 13/026,162 (Apr. 1, 2013).
Supplemental Notice of Allowability for U.S. Appl. No. 13/026,031 (Mar. 22, 2013).
Notice of Allowance and Fee(s) Due for U.S. Appl. No. 13/026,098 (Mar. 11, 2013).
Interview Summary for U.S. Appl. No. 13/026,144 (Mar. 4, 2013).
Supplemental Notice of Allowability for U.S. Appl. No. 13/026,162 (Feb. 27, 2013).
Notice of Allowance and Fee(s) Due for U.S. Appl. No. 13/025,968 (Feb. 27, 2013).
Supplemental Notice of Allowability for U.S. Appl. No. 13/026,162 (Feb. 7, 2013).
Notice of Allowance and Fee(s) Due for U.S. Appl. No. 13/026,031 (Jan. 30, 2013).
Supplemental Notice of Allowability for U.S. Appl. No. 13/026,162 (Jan. 24, 2013).
Notice of Allowance and Fee(s) Due for U.S. Appl. No. 13/026,162 (Dec. 19, 2012).
Communication of European Publication Number and Information on the Application of Article 67(3) EPC for European Patent Application No. 11742923.3 (Nov. 21, 2012).
Communication of European Publication Number and Information on the Application of Article 67(3) EPC for European Patent Application No. 11742909.2 (Nov. 21, 2012).
Communication of European Publication Number and Information on the Application of Article 67(3) EPC for European Patent Application No. 11742906.8 (Nov. 21, 2012).
Communication of European Publication Number and Information on the Application of Article 67(3) EPC for European Patent Application No. 11742901.9 (Nov. 21, 2012).
Final Official Action for U.S. Appl. No. 13/026,105 (Nov. 26, 2012).
Communication of European Publication Number and Information on the Application of Article 67(3) EPC for European Patent Application No. 11742912.6 (Nov. 21, 2012).
Communication of European Publication Number and Information on the Application of Article 67(3) EPC for European Patent Application No. 11742905.0 (Nov. 21, 2012).
Communication of European Publication Number and Information on the Application of Article 67(3) EPC for European Patent Application No. 11742894.6 (Nov. 21, 2012).
Notice of Granting Patent Right for Invention for Chinese Patent Application No. 200680051295.9 (Nov. 6, 2012).
Non-Final Official Action for U.S. Appl. No. 13/026,153 (Nov. 6, 2012).
Non-Final Official Action for U.S. Appl. No. 13/026,144 (Oct. 16, 2012).
Non-Final Official Action for U.S. Appl. No. 13/026,098 (Sep. 20, 2012).

(56) References Cited

OTHER PUBLICATIONS

Non-Final Official Action for U.S. Appl. No. 13/026,060 (Sep. 19, 2012).
Communication of European Publication Number and Information on the Application of Article 67(3) EPC for European Patent Application No. 11742921.7 (Sep. 12, 2012).
Non-Final Official Action for U.S. Appl. No. 13/026,081 (Sep. 12, 2012).
Non-Final Official Action for U.S. Appl. No. 13/026,112 (Aug. 29, 2012).
Non-Final Official Action for U.S. Appl. No. 12/777,853 (Aug. 29, 2012).
First Office Action for Chinese Patent Application No. 200880110878.3 (Aug. 27, 2012).
Communication of European publication number and information on the application of Article 67(3) EPC for European Application No. 10824243.9 (Jul. 25, 2012).
First Official Action for Chinese Patent Application No. 200880103119.4 (Jul. 4, 2012).
Second Office Action for Chinese Patent Application No. 200780034804.1 (Feb. 21, 2012).
Traffix Systems, "Datasheet; Traffix Signaling Delivery Controller (SDC)," pp. 1-5 (May 2011).
Final Official Action for U.S. Appl. No. 13/026,076 (Dec. 7, 2012).
Notice of Allowance and Fee(s) Due for U.S. Appl. No. 13/026,060 (Sep. 25, 2013).
Commony-Assigned, Co-Pending U.S. Appl. No. 14/016,000 titled "Methods, Systems, and Computer Readable Media for Answer-Based Routing of Diameter Request Messages," (unpublished, filed Aug. 30, 2013).
Non-Final Office Action for U.S. Appl. No. 13/026,125 (Aug. 30, 2013).
Non-Final Office Action for U.S. Appl. No. 13/026,133 (Aug. 19, 2013).
Notice of Allowance and Fee(s) Due for for U.S. Appl. No. 13/026,076 (Jun. 27, 2013).
Final Office Action for Chinese Application No. 200880103119.4 (Dec. 4, 2013).
Notice of Allowance and Fee(s) Due for U.S. Appl. No. 12/906,998 (Jul. 31, 2013).
Notice of Allowance and Fee(s) Due for U.S. Appl. No. 12/400,576 (Jul. 19, 2013).
Non-Final Office Action for U.S. Appl. No. 13/026,105 (May 12, 2014).
Notice of Allowance and Fee(s) Due for U.S. Appl. No. 13/932,608 (Apr. 9, 2014).
Non-Final Office Action for U.S. Appl. No. 14/016,000 (Mar. 28, 2014).
Office Action for Israel Patent Application No. 219214 (Mar. 3, 2014).
Commonly-Assigned, Co-Pending U.S. Appl. No. 14/185,438 titled "Methods, Systems, and Computer Readable Media for Performing Diameter Answer Message-Based Network Management at a Diameter Signaling Router (DSR)," (unpublished, filed Feb. 20, 2014).
Notice of Allowance and Fee(s) Due for U.S. Appl. No. 13/026,133 (Feb. 3, 2014).
Notice of Allowance and Fee(s) Due for U.S. Appl. No. 13/026,125 (Jan. 24, 2014).
Extended European Search Report for European Application No. 11742923.3 (Jan. 22, 2014).
Communication pursuant to Article 94(3) EPC for European Application No. 04 751 843.6 (Dec. 3, 2013).
First Office Action for Chinese Application No. 201080056996.8 (Apr. 4, 2014).
Communication pursuant to Article 94(3) EPC for European Application No. 08 770 806.1 (Aug. 6, 2014).
Office Action for Israel Patent Application No. 219214 (Jul. 2, 2014).
Extended European Search Report for European Application No. 08797503.3 (Jun. 5, 2014).
Final Office Action for U.S. Appl. No. 13/026,105 (Sep. 11, 2014).
Notification of the First Office Action for Chinese Application No. 201180013681.X (Aug. 18, 2014).
First Office Action for Chinese Patent Application No. 201180018670.0 (Jul. 14, 2014).
First Office Action for Chinese Patent Application No. 201180013555.4 (Jul. 3, 2014).
First Office Action for Chinese Patent Application No. 201180018952.0 (Jun. 26, 2014).
First Office Action for Chinese Patent Application No. 201180013381.1 (Jun. 5, 2014).
First Office Action for Chinese Application No. 201180008578.6 (May 8, 2014).
Notification of the Second Office Action for Chinese Application No. 201080056996.8 (Sep. 3, 2014).
Notification of the First Office Action for Chinese Application No. 201180018783.0 (Aug. 26, 2014).

* cited by examiner

ROUTING TABLE DATA

| LTE SUBSCRIBER ID | LTE NETWORK NODE URI | LTE NETWORK NODE FQDN | LTE NETWORK NODE IP ADDRESS |
|---|---|---|---|
| IMSI 1 | aaa://host.example.com:1813;transport=udp;protocol=radius | | |
| IMSI 2 | | HSS1@VZW.NET | |
| IMSI 3 | | | 192.23.43.12 PORT 64 |
| IMSI 4 | hss://hss2.vzw.net:1815;transport=udp;protocol=radius | HSS2@VZW.NET | 192.53.34.12 PORT 1815 |
| IMSI 5 | | GW@SPRINT.NET | 194.25.23.4 PORT 534 |
| IMSI 6 | fgw://pdngw3.att.com:1819;transport=udp;protocol=diameter | PDNGW3.@ATT.COM | |

METHODS, SYSTEMS, AND COMPUTER READABLE MEDIA FOR PROVIDING DIAMETER SIGNALING ROUTER WITH INTEGRATED MONITORING FUNCTIONALITY

PRIORITY CLAIM

This application claims the benefit of U.S. Provisional Patent Application Ser. No. 61/252,557 filed Oct. 16, 2009; the disclosure of which is incorporated herein by reference in its entirety.

TECHNICAL FIELD

The subject matter described herein relates to methods and systems for communications in a Diameter network. More particularly, the subject matter described herein relates to methods, systems, and computer readable media for providing a Diameter signaling router with integrated monitoring functionality.

BACKGROUND

In Diameter networks, messages and communications between nodes in the network include information identifying the name and location of each node in the network. For example, when a request message is sent to a server, the server's response includes information identifying the server to the network.

Diameter messages exist in the format of request-answer messages. All answer messages travel back to the request source via the same path through which the request message was routed using hop-by-hop transport. When one Diameter node needs information from another Diameter node, the first Diameter node sends a request identifying itself and its realm or domain, as well as identifying the realm or domain of the Diameter node from which the first Diameter node needs information. The Diameter answer message sent back from the Diameter node that receives the request will include information identifying the receiving Diameter node and its realm or domain.

Message exchange or interaction between Diameter nodes is vital for performing various functions. For example, a mobility management entity (MME) and a Home Subscriber Server (HSS) interact for authentication, authorization, and/or accounting (AAA) purposes. Such interaction is disclosed in $3^{rd}$ generation partnership project (3GPP) technical specification TS 29.272 V9.0.0 (hereinafter referred to as "the technical specification"), the disclosure of which is incorporated by reference herein in its entirety. While this technical specification discloses procedures, message parameters, and protocol for communications between the MME and HSS nodes, interaction between Diameter nodes present various issues, such as routing, monitoring, and security, which are not adequately addressed in this technical specification.

Accordingly, in light of these shortcomings associated with interaction between Diameter nodes, there exists a need for methods, systems, and computer readable media for a Diameter signaling router with integrated monitoring functionality.

SUMMARY

According to one aspect, the subject matter described herein includes a system for a Diameter signaling router with integrated monitoring functionality. The system includes a Diameter signaling router comprising a network interface for receiving, from a first Diameter node, a first Diameter message having Diameter information. The system also includes an integrated monitoring module located within the Diameter signaling router for copying at least a portion of the first Diameter message and providing the copied information associated with the first Diameter message to an application.

According to another aspect, the subject matter described herein includes a method for providing integrated monitoring functionality at a Diameter signaling router. The method includes receiving, from a first Diameter node and at a network interface, a first Diameter message having Diameter information. The method also includes copying at least a portion of the first Diameter message and providing the copied information associated with the first Diameter message to an application.

The subject matter described herein for providing a Diameter signaling router with integrated monitoring functionality may be implemented in hardware, a combination of hardware and software, firmware, or any combination of hardware, software, and firmware. As such, the terms "function" or "module" as used herein refer to hardware, a combination of hardware and software, firmware, or any combination of hardware, software, and firmware for implementing the features described herein. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

BRIEF DESCRIPTION OF THE DRAWINGS

Preferred embodiments of the subject matter described herein will now be explained with reference to the accompanying drawings, wherein like reference numerals represent like parts, of which:

FIG. 5 is a diagram illustrating an exemplary table for storing data usable by a Diameter signaling router for translating LTE subscriber identifying information into LTE node addressing or routing information according to an embodiment of subject matter described herein;

DETAILED DESCRIPTION

In accordance with the subject matter disclosed herein, methods, systems, and computer readable media are provided for providing a Diameter signaling router with integrated monitoring functionality. Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
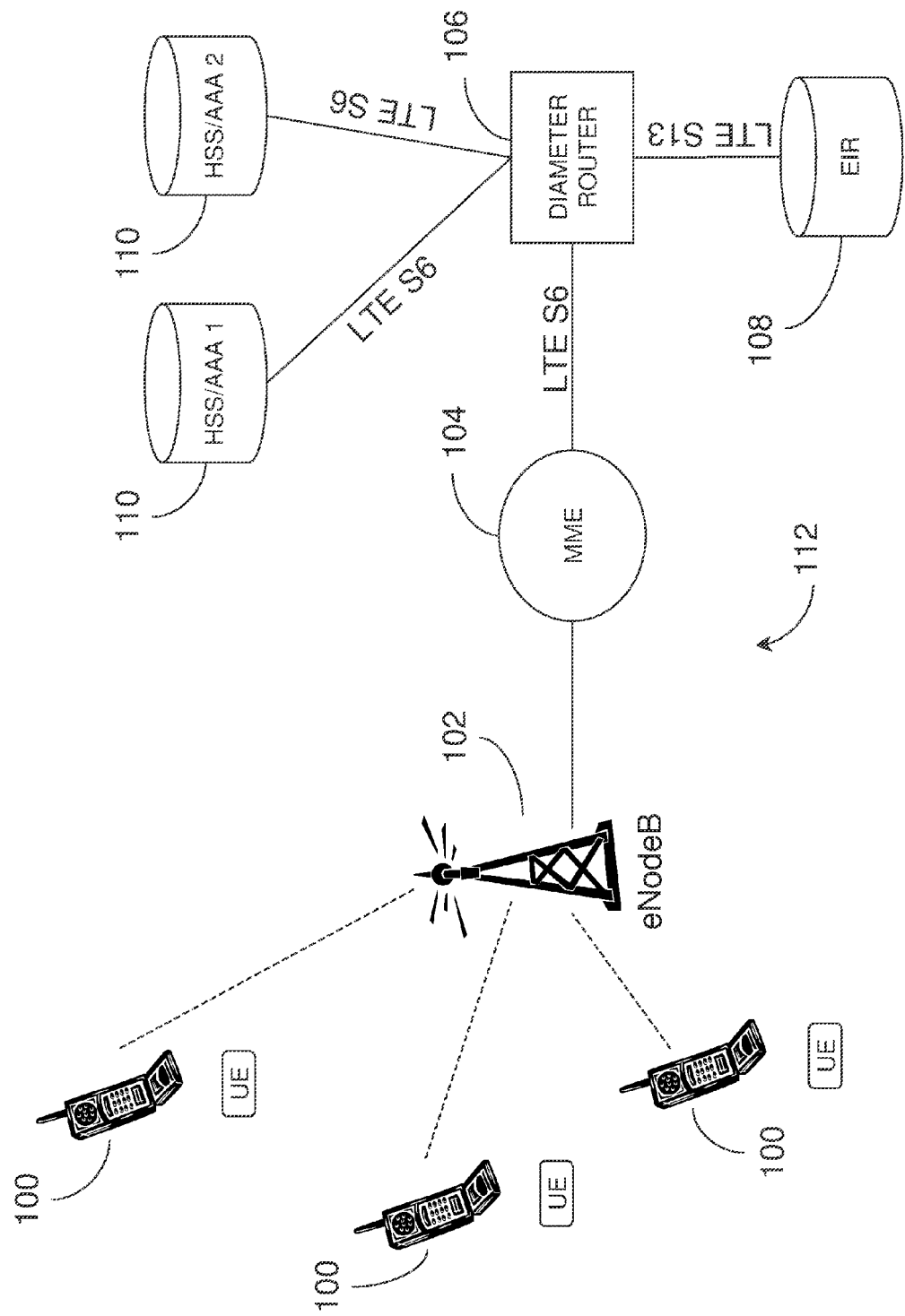
FIG. 1 is a block diagram illustrating an exemplary LTE network including the present invention according to an embodiment of the subject matter described herein.

FIG. 1 is a block diagram illustrating an exemplary Long Term Evolution (LTE) network 112 including a Diameter signaling router according to an embodiment of the subject matter described herein. Referring to FIG. 1, network 112 may include user equipment (UE) 100, eNodeB 102 (also referred to herein as transceiver node), mobility management entity (MME) 104, Diameter signaling router 106, an equipment identity register (EIR) database 108, home subscriber servers (HSS), authentication, authorization, and accounting (AAA) servers (collectively referred to hereinafter as HSS/AAA) 110.

UE 100 (e.g., mobile handsets) are connected to eNodeB or transceiver node 102, which performs radio access functions similar to a base transceiver station (BTS). Transceiver node 102 may provide UE-related information (e.g., location- or mobility-related data) or UE-initiated messages to a mobility management entity (MME) 104. MME 104 performs tracking of UEs 100 and may communicate information (e.g., mobility-related information) to other nodes in LTE network 112 via a Diameter signaling router 106.

Diameter signaling router 106 may be any suitable entity for routing Diameter signaling messages. For example, Diameter signaling router 106 may be an LTE signaling router, an LTE Diameter signaling router, a Diameter proxy, a Diameter routing agent, or a Diameter redirect agent. Router 106 may include functionality for processing various messages. In one embodiment, such functionality may be included in one or more modules (e.g., a firewall module, a network address translation (NAT) module, a subscriber location module, and a routing module). It will be appreciated that functionality and modules as used herein refers to hardware, software, firmware, or any combination of hardware, software, and firmware for implementing the features described herein.

In various embodiments, router 106 may include a Diameter proxy, a Diameter routing agent, or a Diameter redirect agent. For example, router 106 may operate in a proxy mode, relay mode, and/or a redirect mode as described in further detail below.

In one embodiment, router 106 may screen, forward, redirect, and/or forward messages to various network nodes, such as MME 104, HSS/AAA 110, EIR database 108, and other Diameter-related nodes.

In one embodiment, router 106 may communicate with MME 104, HSS/AAAs 110, EIR database 108, and other LTE-related nodes via one or more signaling interfaces. For example, router 106 may exchange or communicate messages between MME 104 and HSS/AAAs 110 via one or more LTE S6 interfaces. In a second example, router 106 may exchange or communicate messages between EIR database 108 via one or more LTE S13 interfaces.

In another embodiment, router 106 may communicated with non-LTE-related nodes via one or more non-LTE signaling interfaces. For example, router 106 may communicate with IP multimedia subsystem (IMS) nodes, such as call session control functions (CSCF), using IMS-related interfaces. For instance, router 106 may receive Diameter messages from a CSCF via a Cx Diameter interface.

In one embodiment, Diameter signaling router 106 includes firewall and/or NAT functionality. As will be described in further detail below, firewall functionality may include using one or more policies or rules for determining whether to allow messages to be processed further (e.g., routed or forwarded by router 106) or deny messages from being processed further. Additionally, as will be described in more detail below, Diameter signaling router 106 may include NAT functionality for modifying information in received Diameter signaling messages or generating new Diameter signaling messages based on received messages. Additionally, router 106 may perform device authentication using EIR database 108.

EIR database 108 (also referred to herein as an EIR node) includes information associated with device or UE 100 identification. In one embodiment, EIR database 108 may include a list of device identifiers (e.g., an international mobile equipment identifier (IMEI)) and their associated status regarding network accessibility. For example, EIR database 108 may include a list of device identifiers that are allowed to use a node or network (e.g., a whitelist). In another example, EIR database 108 may include a list of device identifiers that are not allowed to use a node or network (e.g., a blacklist). In a third example, EIR database 108 may include a whitelist and a blacklist for various devices (e.g., stolen devices, emergency devices) and/or situations (e.g., normal load activity, heavy load activity).

HSS/AAAs 110 represents an HSS and/or an AAA server. In one embodiment, HSS/AAAs 110 may include HSS functionality. For example, HSS/AAAs 110 may maintain subscriber-related information, such as user identification, control information for user authentication and authorization, location information, and user profile data. In one embodiment, an HSS/AAAs 110 may also include AAA functionality. For example, HSS/AAAs 110 may perform authentication, authorization, and accounting functions associated with the subscriber. In another embodiment, AAA functionality may be performed by or performed at a node separate or independent from an HSS.

It will be appreciated that Diameter signaling router 106 may additionally be connected to other network nodes, such as a multimedia messaging service center (MMSC), a Policy Charging Rule Function (PCRF), and a Policy and Charging Enforcement Function (PCEF), to provide additional functions and services to network subscribers.

Figure 2:
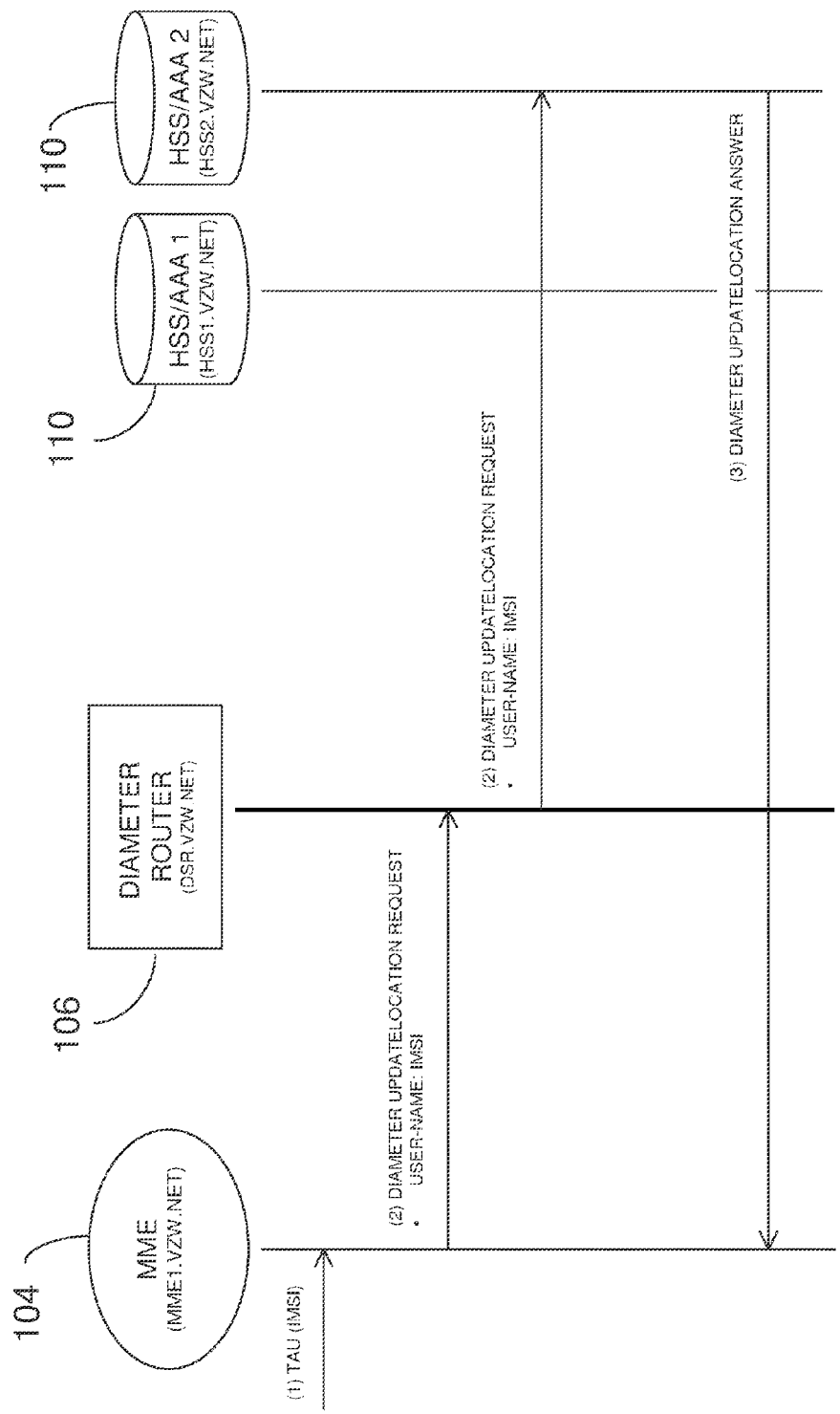
FIG. 2 is a signaling message flow diagram illustrating routing messages via a Diameter signaling router in a relay mode according to an embodiment of the subject matter described herein.

FIG. 2 is a signaling message flow diagram illustrating routing messages via Diameter signaling router 106 according to an embodiment of the subject matter described herein. In the embodiment illustrated in FIG. 2, a portion of exemplary LTE network 112 is depicted and router 106 is configured to operate in a relay mode. In on embodiment, router 106 operating in relay mode may receive messages intended for other locations or nodes and, using the information in a received message and/or other accessible information (e.g., a subscriber/node location database, a domain name system (DNS) database, etc.), may relay or forward at least a portion of the received message toward an appropriate destination.

As stated above, in one embodiment, router 106 includes functionality for receiving or processing one or more Diameter signaling messages. For example, router 106 may receive and process Diameter messages via an LTE S6 interface, LTE S13 interface, or other LTE-related interfaces.

In one embodiment, the received Diameter messages may include one or more messages defined in the technical specification incorporated in its entirety above. For example, the Diameter messages may include one or more of an UpdateLocation Request (ULR) message, an UpdateLocation Answer (ULA) message, an AuthenticationInformation Request (AIR) message, an AuthenticationInformation Answer (AIA) message, a CancelLocation Request (CLR) message, a CancelLocation Answer (CLA) message, an InsertSubscriberData Request (IDR) message, an InsertSubscriberData Answer (IDA) message, a DeleteSubscriberData Request (DSR) message, a DeleteSubscriberData Answer (DSA) message, a PurgeUE Request (PUR) message, a PurgeUE Answer (PUA) message, a Reset Request (RSR) message, a Reset Answer (RSA) message, a Notify Request (NOR) message, a Notify Answer (NOA) message, an MEIdentityCheck Request (ECR) message, and an MEIdentityCheck Answer (ECA) message.

In the embodiment illustrated in FIG. 2, MME 104 is configured for receiving location-related message from UE 100 or associated network nodes and communicating or attempting to communicate with one or more HSS/AAA 110 using Diameter signaling router 106. In one embodiment, MME 104, router 106, and HSS/AAAs 110 may exchange messages via one or more LTE S6 interfaces.

Referring to FIG. 2, a Diameter message is received at MME 104. In one embodiment, the received Diameter message is a registration message referred to as a tracking area update (TAU) message. The TAU message or registration message may be initiated by a UE 100 when the UE 100 detects entering a tracking area that is not previously registered in the MME 104 for use by the UE 100. The TAU message may include UE-related information, such as an International Mobile Subscriber Identity (IMSI) value.

In one embodiment, in response to receiving the Diameter message, MME 104 may generate and launch a Diameter message that is intended for an HSS/AAA 110. In one embodiment, MME 104 may generate and launch an UpdateLocation Request (ULR) message in response to receiving the TAU message. The ULR message may include various parameters, such as the IMSI value associated with the TAU message.

In one embodiment, MME 104 may not determine or be unable to provide addressing or routing information for sending the generated message to a particular HSS/AAA 110. In this embodiment, router 106 may be configured to receive and route such messages. In another embodiment, router 106 may be configured to receive and forward routable messages (e.g., using accessible databases). In yet another embodiment, router 106 may be configured to route, block, or redirect messages.

Diameter signaling router 106 may receive a message launched by MME 104. For example, as illustrated in FIG. 2, router 106 receives the ULR message launched by MME 104. Router 106 may examine the received message and determine whether and/or how to route the message.

For example, it may be desirable for a network operator to include multiple HSS/AAAs 110 in a communications network to distribute or reduce processing load on any particular HSS/AAA 110. If each of the multiple HSS/AAAs 110 is identically provisioned, i.e., includes copies of the same subscriber data, the HSS/AAAs 110 may operate in a load sharing manner. As such, it may be unnecessary to determine which HSS/AAAs 110 holds a particular subscriber's data. However, if HSS/AAAs 110 do not include identical data, it may be necessary to identify the HSS/AAA 110 that contains a particular subscriber's data when attempting to route messages.

In an embodiment where subscribers are handled by a plurality of HSS/AAAs 110, router 106 may use the IMSI value and/or other information in determining addressing or routing information for appropriate destinations. For example, router 106 may include functionality (e.g., located in a subscriber location module) for accessing one or more subscriber/node location databases. A location database may store associations between subscriber-related information (e.g., IMSI values, or IMSI value ranges) and appropriate nodes, such as serving HSS/AAAs 110. In one embodiment, a location database may include a hierarchical data structure that contains a range-based section that includes associations between groups and/or ranges of subscriber identifiers (e.g., IMSI values) and associated node identifiers (e.g., URIs of HSS/AAAs 110). Likewise, the database may also contain an exceptions-based section, which includes associations between subscriber identifiers and associated node identifiers that are exceptions or different from associations in the range-based section.

In an embodiment where router 106 includes subscriber/node location database access functionality, router 106 may use subscriber-related information (e.g., an IMSI value or a portion thereof) associated with a received message for performing one or more lookups on a location database. For example, router 106 may use the IMSI value associated with a received ULR message in searching the exceptions-based section of the location database. If a matching entry is found in the exceptions-based section of the location database, then the associated node identification information may be obtained and used in routing the Diameter message (e.g., forwarding the message towards the HSS/AAA 110 identified by the lookup). If a match is not located in the exceptions-based section of the location database, the range-based section may be subsequently searched.

In one embodiment, router 106 searches the exceptions-based section for determining whether the IMSI value or a portion thereof is associated with a designated group of identifiers specified by an entry. For example, an IMSI value may be a 14 or 15 digit value. The IMSI value may include portions representing various subscriber-related information, such as 3 digits representing the Mobile Country Code (MCC), followed by 2-3 digits representing the Mobile Network Code, and the remaining digits representing the mobile station identification number (MSIN) within the network's customer base.

In one embodiment, router 106 may use only a portion of the IMSI value (e.g., the MNC) in determining which HSS/AAA 110 is the appropriate destination. For example, in network 100, each HSS/AAA 110 may maintain subscriber-related information for subscribers of a particular service provider (e.g., Verizon, AT&T, or T-Mobile). In such an example, router 106 may use an MNC of an IMSI value (e.g., "012" or "12" is the MNC of the IMSI value "310012353464342") associated with a received message for determining that the message should be routed to an HSS/AAA 110 associated with that MNC (e.g., MNC "12" is associated with Verizon).

In one embodiment, if a match is located in the range-based section 110, then the associated node identification information may be obtained and used in forwarding the Diameter message. For example, the addressing or routing information may be used in forwarding a ULR message towards the HSS/AAA 110 identified by the lookup.

In one embodiment, if a match is not located, router 106 may route message to a default node. In another embodiment, router 106 may notify an originating node (e.g., MME 104) or previous hop that a received message is un-routable. For example, router 106 may generate and launch an error message towards MME 104 indicating that a destination for a particular message is unknown, inaccurate, or un-routable.

In one embodiment, after determining an appropriate destination (e.g., an HSS/AAA 2 110) for a received message, router 106 may modify the message, e.g., to include the destination information. In an alternative embodiment, router 106 may not modify the message. Router 106 may route the message towards the appropriate destination. For example, in FIG. 2, router 106 may relay or send a modified ULR message towards HSS/AAA 2 110.

In one embodiment, HSS/AAA 2 110 may receive a Diameter message and respond. For example, in response to receiving an ULR message, HSS/AAA 2 110 may send an Update-Location Answer (ULA) message indicating that location information was received and stored. In one embodiment, a response message corresponding to the routed message (e.g., from HSS/AAA 2 110) may be processed or routed by router 106. For example, router 106 may use stored state information or other information (e.g., addressing or routing information in the message) for sending the response message towards MME 104. In another embodiment, a response message corresponding to the routed message (e.g., from HSS/AAA 2 110) may not be processed or routed by router 106. For example, HSS/AAA 2 110 may provide destination addressing or routing information for sending the message towards MME 104 without router 106.

Figure 3:
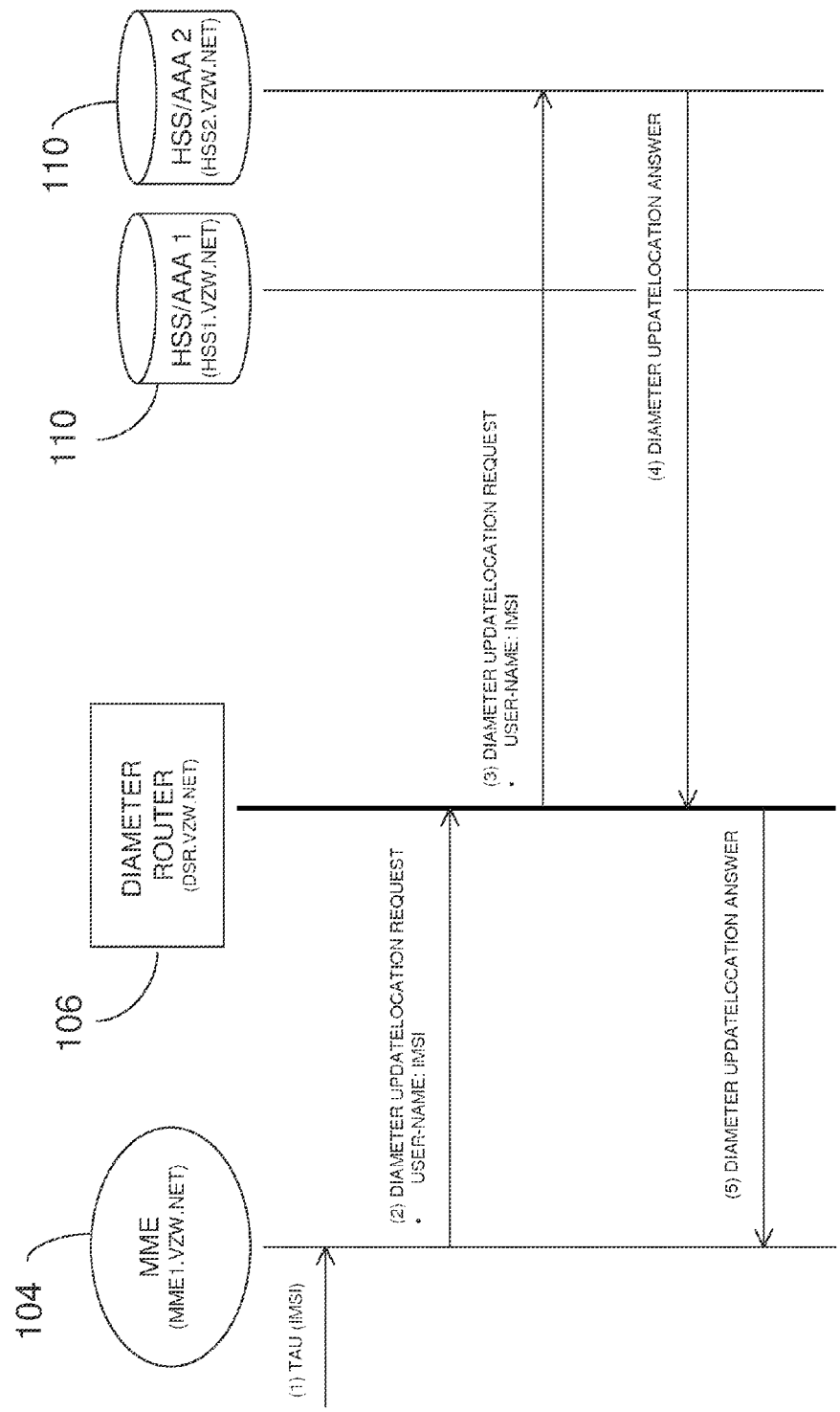
FIG. 3 is a signaling message flow diagram illustrating routing messages via a Diameter signaling router in a proxy mode according to an embodiment of the subject matter described herein.

FIG. 3 is a second signaling message flow diagram illustrating routing messages via Diameter signaling router 106 according to an embodiment of the subject matter described herein. In the embodiment illustrated in FIG. 3, a portion of exemplary LTE network 112 is depicted and router 106 is configured to operate in a proxy mode.

In one embodiment, router 106 operating in proxy mode may receive messages addressed to itself and may route at least a portion of the received messages to other locations or nodes using the information in a received message and/or other accessible information. Router may also be configured to receive response messages corresponding to the routed messages and may route the response messages or a portion thereof to appropriate destinations (e.g., the node that launched the associated query message).

In the embodiment illustrated in FIG. 3, except as disclosed herein, the nodes depicted in FIG. 3 are essentially the same as described in reference to FIG. 2. Further, the first two messages of FIG. 3, (FIG. 3, messages 1 and 2), are essentially the same as the first two messages of FIG. 2. Therefore, descriptions of the nodes and the first two messages will not be repeated herein.

In the embodiment illustrated in FIG. 3, in response to receiving a Diameter message, router 106 may generate and launch a new Diameter message based on the original received message. For example, router 106 may terminate a received ULR message and use information in the message, such as an IMSI value or portion thereof, for determining which HSS/AAA 100 to send at least a portion of the received ULR message. After determining an appropriate destination (e.g., an HSS/AAA 2 110), router 106 may generate a new ULR message and include addressing or routing information for the appropriate destination and may routes the new ULR message to the destination (e.g., HSS/AAA 2 110).

In an alternative embodiment, router 106 may receive a Diameter message and, using the IMSI to determine or identity an appropriate destination, route the message towards the appropriate destination (e.g., HSS/AAA 2 110). In this embodiment, router 106 may or may not modify the message to include the destination information.

HSS/AAA 2 110 may receive a Diameter message and respond. For example, in response to receiving a ULR message, HSS/AAA 2 110 may send a ULA message indicating that location information was received and stored. In one embodiment, a response message corresponding to the routed message (e.g., from HSS/AAA 2 110) may be processed or routed by router 106. For example, as illustrated in FIG. 3, router 106 may receive a ULR message from HSS/AAA 2 110. Router 106 may terminate the ULA message and generates a new ULA message that is based on the ULA message received from the HSS/AAA 2 110. In one embodiment, the generated ULA message may include source addressing or routing information associated with router 106 and/or other information such that router 106 acts as a proxy for HSS/AAA 2 110. In this embodiment, Router 106 may route the generated message to an appropriate destination, e.g., the node that launched the associated query message.

In another embodiment, a response message corresponding to the routed message (e.g., from HSS/AAA 2 110) may not be processed or routed by router 106. For example, HSS/AAA 2 110 may provide destination addressing or routing information for sending the message towards MME 104 without router 106.

Figure 4:
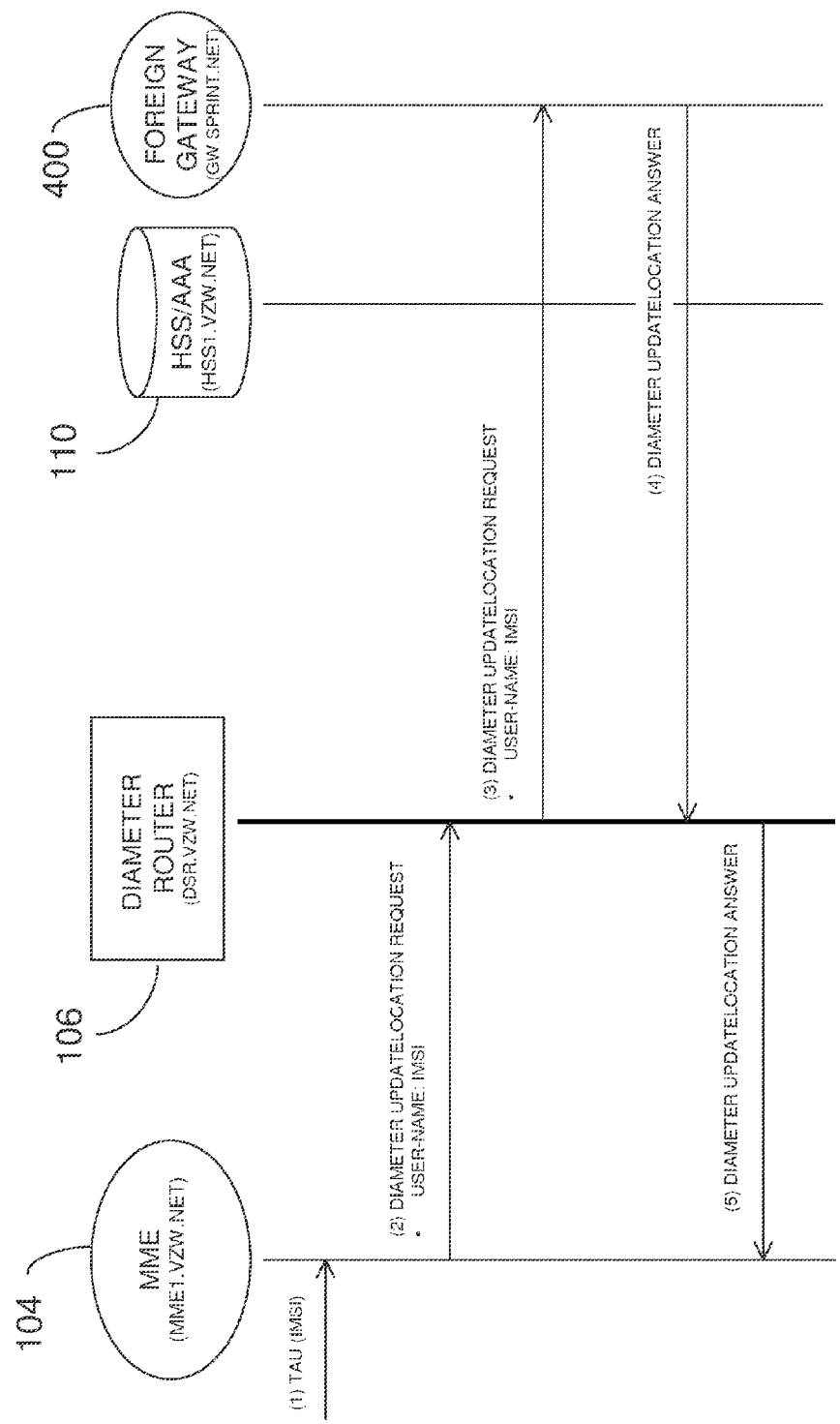
FIG. 4 is a signaling message flow diagram illustrating routing messages to a foreign gateway via a Diameter signaling router according to an embodiment of the subject matter described herein.

FIG. 4 is another signaling message flow diagram illustrating routing messages via Diameter signaling router 106 according to an embodiment of the subject matter described herein. In the embodiment illustrated in FIG. 4, a portion of exemplary LTE network 112 is depicted and, MME 104 is configured to communicate with an out of network Diameter gateway (also referred to herein as a foreign gateway) 400 using Diameter signaling router 106.

Foreign gateway 400 represents an entity associated with roaming or foreign subscribers, such as subscribers that are not associated with the current network or service provider. For example, foreign gateway 400 may be contacted for receiving or providing AAA-related or mobility-related information associated with foreign subscribers. In this embodiment, router 106 may include functionality for routing at least a portion of a message sent by MME 104 to an appropriate foreign gateway 400.

Except as disclosed herein, the other nodes depicted in FIG. 4 are essentially the same as described in reference to FIG. 3. Further, the messages of FIG. 4, (FIG. 4, messages 1-5), are essentially the same as the messages of FIG. 3 except that the messages of FIG. 4 are associated with or intended for foreign gateway 400. Therefore, descriptions of these nodes and messages will not be repeated herein.

In the embodiment illustrated in FIG. 4, in response to receiving a Diameter message associated with or intended for foreign gateway 400, router 106 may generate and launch a new Diameter message based on the original received message. For example, router 106 may terminate a received ULR message and use information in the message, such as an IMSI value or portion thereof, for determining an appropriate node towards which to route at least a portion of the received ULR message. After determining an appropriate destination (e.g., foreign gateway 400), router 106 may generate a new ULR message and include addressing or routing information for the appropriate destination and may routes the new ULR message to the destination (e.g., foreign gateway 400).

In another embodiment, router 106 may receive a Diameter message and, using the IMSI to determine or identity an appropriate destination, route the message towards the appropriate destination (e.g., foreign gateway 400). In this embodiment, router 106 may or may not modify the message to include the destination information.

In yet another embodiment, router 106 may receive a Diameter message and, using the IMSI to determine or identity an appropriate destination, determine not to route message. In this embodiment, router 106 may be configured to operate in a redirect mode.

In one embodiment, in redirect mode, router 106 may determine a destination or a node for further processing. Router may send a message or otherwise notify the originating node (e.g., MME 104) or a previous hop of addressing or routing information for communicating with the appropriate node. For example, router 106 may determine that a ULR message should be sent to foreign gateway 400. In this example, router 106 may be unable to communicate with foreign gateway 400 and may provide addressing or routing information to MME 104 so that MME 104 can redirect the ULR message to gateway 400.

Foreign gateway 400 may receive a Diameter message and respond. For example, in response to receiving a ULR message, foreign gateway 400 may send a ULA message indicating that location information was received and stored. In one embodiment, a response message corresponding to the routed message (e.g., from foreign gateway 400) may be processed or routed by router 106. For example, as illustrated in FIG. 4, router 106 may receive a ULR message from foreign gateway 400. Router 106 may terminate the ULA message and generates a new ULA message that is based on the ULA message received from foreign gateway 400. In one embodiment, the generated ULA message may include source addressing or routing information associated with router 106 and/or other information such that router 106 acts as a proxy for foreign gateway 400. Router may route the generated message to an appropriate destination, e.g., the node that launched the associated query message.

In another embodiment, a response message corresponding to the routed message (e.g., from foreign gateway 400) may not be processed or routed by router 106. For example, foreign gateway 400 may provide destination addressing or routing information for sending the message towards MME 104 without router 106.

FIG. 5 is a diagram illustrating an exemplary table for storing information usable by Diameter signaling router 106 for translating LTE subscriber identifying information into LTE node addressing or routing information according to an embodiment of subject matter described herein. In particular, FIG. 5 depicts a table 500 that includes exemplary data that may be accessed and/or stored by router 106. Table 500 includes an LTE subscriber ID field, an LTE network node uniform resource identifier (URI) field, an LTE network node fully qualified domain name (FQDN) field, and an LTE network node Internet protocol (IP) address field.

Subscriber ID field may include LTE subscriber or device identifiers (or portions thereof), such as an IMSI, a mobile subscriber integrated services digital network (MSISDN) number, a short code, a URI, IMEI, and a mobile identification number (MIN). LTE network node URI, FQDN, and IP address fields represents fields for storing addressing or routing information for nodes that are associated with a subscriber ID or group of subscribers. For example, table 500 may include subscriber location information (e.g., as found in a location database disclosed above). In this example, table 500 may include an entry with an IMSI value (e.g., IMSI value: "310012353464342") in the subscriber ID field and an URI value (e.g., URI value: "aaa://host.example.com:1813; transport=udp;protocol=radius") in the network node URI field. The URI value may be associated with a serving HSS/AAA 110 (e.g., HSS/AAA 2 110) for the subscriber identified by the IMSI value. In a second example, table 500 may include an entry with a portion of an IMSI value (e.g., IMSI portion value: "314024") in the subscriber ID field and an FQDN value (e.g., FQDN value: "HSS1@VZW.NET") in the network node FQDN field. This table entry may indicate a group of subscribers (e.g., subscribers having the same initial 6 digits for their IMSI values) that are associated with a particular node identified by the FQDN value. In a third example, table 500 may include an entry with an IMSI value or a portion thereof (e.g., IMSI value: "310012353464342") in the subscriber ID field and one or more types of network node identifiers for identifying an associated node. As such, in this third example, router 106 may use a URI, a FQDN, and/or an IP address information for routing a message to an appropriate network node for processing.

It will be appreciated that the information stored, accessed, or used by router 106 may vary depending on the communications network, configuration, messages, and network nodes involved. For example, types of addressing or routing information may vary for network nodes. In one embodiment, each entry may include a subscriber ID or portion thereof and addressing or routing information for one associated node in the network node Uniform Resource Identifier (URI) field, network node fully qualified domain name (FQDN) field, and network node Internet protocol (IP) address fields. In this embodiment, multiple entries may be used to identify additional nodes. In another embodiment, each entry may include one or more associated nodes (e.g., backup or secondary node addresses). In this embodiment, additional fields (e.g., backup node fields) may be used to identify additional nodes. In some embodiment, table 500 may include one or more status fields for identifying whether an associated node is currently available.

Figure 6:
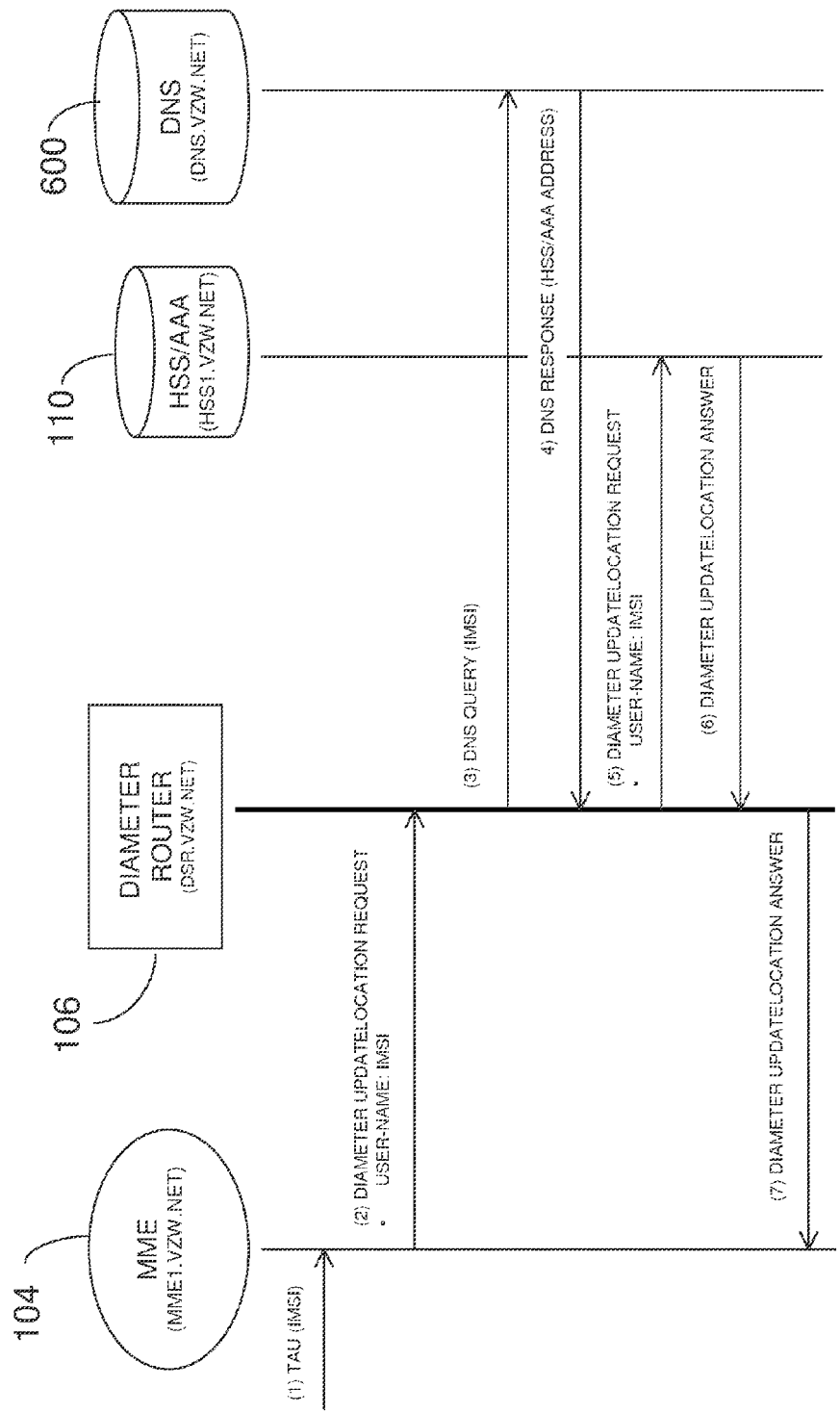
FIG. 6 is a signaling message flow diagram illustrating routing messages via a Diameter signaling router using address resolution according to an embodiment of the subject matter described herein.

FIG. 6 is another signaling message flow diagram illustrating routing messages via Diameter signaling router 106 according to an embodiment of the subject matter described herein. In the embodiment illustrated in FIG. 6, a portion of exemplary LTE network 112 is depicted and router 106 is configured for accessing a DNS database 600 and using such information when determining whether and/or how to route the Diameter message.

DNS database 600 represents a storage element or function for maintaining subscriber-related or node-related mapping information. For example, DNS database 600 may include associations between subscriber identifiers (e.g., IMSI values, subscriber URIs, MSISDN number) and addressing or routing information for associated nodes (e.g., URIs, FQDNs, IP addresses), such as information of table 500. In one embodiment, DNS database 600 may associate IMSI values to URI values. In this embodiment, database 600 may be used for performing IMSI-to-URI queries or lookups (also referred to herein as UTI dips). In one embodiment, database 600 may be located as an external or separate node from router 106. In another embodiment, database 600 may be co-located or integrated with router 106.

Except as disclosed herein, the other nodes depicted in FIG. 6 are essentially the same as described in reference to FIG. 2. Further, the first two messages of FIG. 6, (FIG. 6, messages 1 and 2), are essentially the same as the first two messages of FIG. 2. Therefore, descriptions of the nodes and the first two messages will not be repeated herein.

Referring to FIG. 6, in response to receiving a Diameter message having subscriber or node identifying information, router 106 may use the identifying information (e.g., an IMSI value) in querying DNS database 600.

In one embodiment, the query message may include an IMSI value for determining addressing or routing information (e.g., URI address) of an associated node (e.g., a serving HSS/AAA 100). DNS database node (e.g., DNS server) may receive the query message, perform one or more lookups on database 600, and respond based on results of lookups.

In another embodiment, the query message may include an IMSI value and/or routing information (e.g., a FQDN or IP address of an associated node) for determining alternate addressing or routing information (e.g., a URI address of an associated node). For example, router 106 may be unable to use FQDN values for routing messages and, instead, may need an URI or IP address. As such, router 106 may launch a DNS query message that includes a FQDN value identifying a destination. In this example, a DNS response message may include an IP address associated with the FQDN value. Router 106 may use the returned IP address for routing messages to the destination.

In one embodiment, DNS database node (e.g., DNS server) may receive the query message, perform one or more lookups on database 600, and respond based on results of lookups. If a match is found in the location database 600, the associated identification information may be obtained and used in routing the Diameter message towards the node identified by the lookup. For example, as illustrated in FIG. 6, DNS database node may send a response message to router 106 for providing appropriate routing information of an associated node (e.g., a session initiation protocol (SIP) URI associated with HSS/AAA 110). If a match is not located, DNS database node may send a response message to router 106 indicating that appropriate routing information was not found.

In one embodiment, if a response message indicates that a match is not located, router 106 may route message to a default node associated with that network or service provider. In another embodiment, if a response message indicates that a match is not located, router 106 may notify an originating node (e.g., MME 104) or previous hop that a received message is un-routable. For example, router 106 may generate and launch an error message towards MME 104 indicating that a destination for a particular message is unknown, inaccurate, or un-routable.

In response to receiving a response message that includes routing information, router 106 may use routing information in routing a message to a destination identified by the routing information. In one embodiment, router 106 may generate and launch a new Diameter message based on the original received message. The new Diameter message may include addressing or routing information for the appropriate destination. For example, as illustrated in FIG. 6, the routing information returned by the ITU server may identify an in-network URI, such as HSS/AAA 110. In this example, the new Diameter message may include routing information for HSS/AAA 110 and route the message accordingly.

In an embodiment where returned routing information identifies the subscriber as belonging to another network (e.g., ported out), router 106 may act in a relay mode and forward the Diameter message to the ported-out network. The forwarded Diameter message may or may not be modified to include the destination information. In yet another embodiment, router 106 may act in a proxy mode and contact the out-of-network HSS/AAA 110 on behalf of an originating MME 104. In still another embodiment, router 106 may act in a redirect mode and respond back to an originating MME 104. Router 106 may instruct MME 104 to contact an appropriate node. It will be appreciated that these embodiments may be similar to the relay, proxy, and redirect embodiments illustrated and discussed above.

HSS/AAA 110 may receive a Diameter message and respond. For example, in response to receiving a ULR message, HSS/AAA 110 may send a ULA message indicating that location information was received and stored. In one embodiment, a response message corresponding to the routed message (e.g., from HSS/AAA 110) may be processed or routed by router 106. For example, as illustrated in FIG. 6, router 106 may receive a ULR message from HSS/AAA 110. Router 106 may terminate the ULA message and generates a new ULA message that is based on the ULA message received from HSS/AAA 110. In one embodiment, the generated ULA message may include source addressing or routing information associated with router 106 and/or other information such that router 106 acts as a proxy for HSS/AAA 110. Router 106 may route the generated message to an appropriate destination, e.g., the node that launched the associated query message.

In another embodiment, a response message corresponding to the routed message (e.g., from HSS/AAA 110) may not be processed or routed by router 106. For example, HSS/AAA 110 may provide destination addressing or routing information for sending a message towards MME 104 without router 106.

Figure 7:
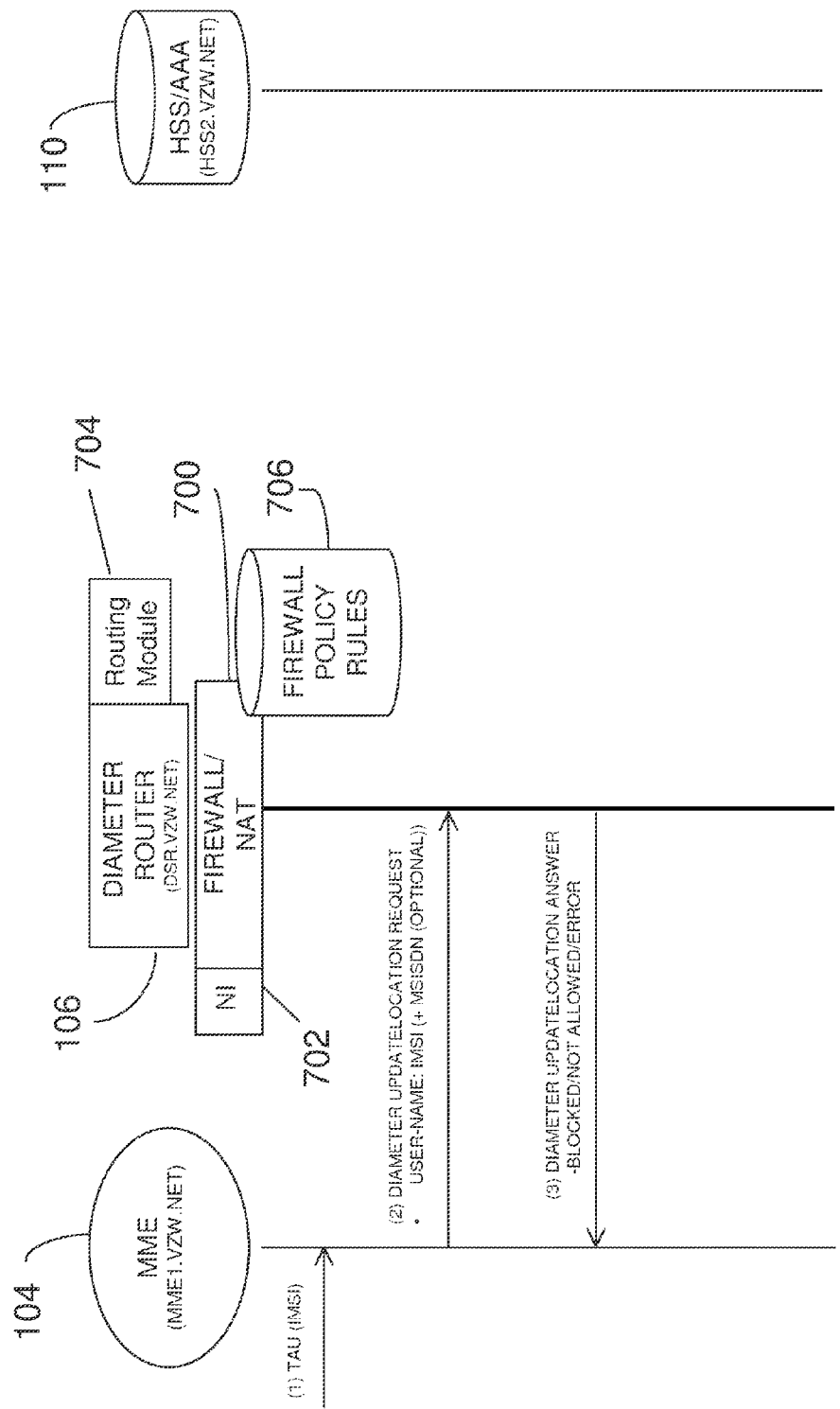
FIG. 7 is a signaling message flow diagram illustrating a Diameter signaling router providing firewall functionality according to an embodiment of the subject matter described herein.

FIG. 7 is a signaling message flow diagram illustrating a Diameter signaling router providing firewall functionality according to an embodiment of the subject matter described herein. In the embodiment illustrated in FIG. 7, a portion of exemplary LTE network 112 is depicted and router 106 includes firewall/NAT module 700. Diameter signaling router 106 may include a network interface 702 that receives Diameter signaling messages from a network node, such as MME 104 or HSS 110. Firewall/NAT module 700 filters Diameter signaling messages based on information in the Diameter portions of the messages. For messages that pass the filtering or satisfy a Diameter firewall policy, a routing module 704 routes those messages to a different Diameter node.

Firewall/NAT module 700 may be implemented in software in combination with hardware and/or firmware. It will be appreciated that firewall/NAT module 700 may be included in one or more modules (e.g., a firewall module, a NAT module, a firewall/NAT module). For example, a firewall module may include any or all functionality as described herein.

In one embodiment, router 106 that includes firewall/NAT module 700 is operable to enforce one or more firewall policy rules and/or perform NAT. For example, router 106 may perform Diameter router and firewall filtering functions. Firewall/NAT module 700 may include functionality for accessing one or more databases, such as firewall policy rules database 706. Rules database 706 may include information associated with policies and/or rules for determining whether to allow or deny further processing of a received message. For example, rules may be used for determining whether a received message is forwarded towards a destination by router 106.

In one embodiment, policies include one or more rules in database 706. The rules may involve various characteristics or conditions associated with a message or subscriber, e.g., a subscriber, an origination network, a destination node, a destination network, a device, a service provider, network conditions, message characteristics, and/or message parameters. In one embodiment, database 706 may include rules indicating characteristics associated with a message and/or a subscriber for allowing messages to be forwarded or processed by router 106. Database 706 may also include rules indicating characteristics associated with a message and/or a subscriber for denying or blocking messages from being routed or further processed by router 106.

In one embodiment, database 706 may include various data structures for representing firewall policies or firewall rules for a subscriber, device, or group of subscribers (e.g., subscribers of a particular service provider). For example, database 706 may include one or more policy tables for subscribers of different service providers.

In one embodiment, rules may be associated with at least one of a message parameter, a value, a parameter length, a message length, a destination, an origination, a session, a network address in a Diameter message processed by a network address translator, a network address in a Diameter message not processed by a network address translator, exclusion of a message parameter, inclusion of a message parameter, a message type, manner in which a message is received, time of day, and time of week.

In one embodiment, policy or rules may also include information for accessing data structures. For example, firewall policy rules may specify whitelists and/or blacklists for parameters in a Diameter message (e.g., blacklists and/or whitelists for IMSI, MSISDN, SGSN, Visited-PLMN-Id, etc.). For example, a firewall policy may include information for accessing a whitelist associated with emergency devices in a particular network. In a second example, a firewall policy may include information for accessing a blacklist associated with stolen devices.

In an embodiment where router 106 includes firewall/NAT module 700, router 106 may be configured for receiving, examining and/or modifying one or more Diameter messages. For example, router 106 (e.g., using firewall/NAT module 700) may be configured for examining and/or modifying information in Diameter messages. For example, examinable and/or modifiable Diameter information may include Diameter header portion information, a Diameter version, a Diameter message length, a Diameter flag, a command code (CC), a Diameter application identifier (ID), a hop by hop ID, an end to end ID, Diameter data portion information, a Diameter attribute value pair (AVP), an AVP parameter, an AVP code, an AVP flag, an AVP length, a vendor ID, AVP data, a parameter, a subscriber identifier, a device identifier, an international mobile subscriber identifier (IMSI), a mobile subscriber integrated services digital network (MSISDN) number, a short code, a uniform resource identifier (URI), an international mobile equipment identifier (IMEI), a mobile identification number (MIN), an Auth-Session-State parameter, a Origin-Host parameter, a Origin-Realm parameter, a Destination-Host parameter, a Destination-Realm parameter, a User-Name parameter, a Supported-Features parameter, a Terminal-Information parameter, a RAT-Type parameter, a ULR-Flags parameter, a Visited-PLMN-Id parameter, a SGSN-Number parameter, a Proxy-Info parameter, and a Route-Record parameter.

In the embodiment illustrated in FIG. 7, MME 104 is configured to communicate or attempt to with one or more HSSs and/or AAA servers (hereinafter referred to as HSS/AAAs) 110 using Diameter signaling router 106. Router 106 may provide firewall functionality. In one embodiment, MME 104, router 106, and HSS/AAAs 110 may exchange messages via one or more LTE interfaces, such as an S6 interface. Diameter messages sent or received via an LTE S6 interface or other LTE-related interfaces may include one or more messages defined in the technical specification incorporated in its entirety above.

As illustrated in FIG. 7, a Diameter message may be received at MME 104. In one embodiment, the received Diameter message is a registration message referred to as a tracking area update (TAU) message. The TAU message may include UE-related information, such as an International Mobile Subscriber Identity (IMSI) value. In response to receiving the Diameter message, MME 104 may generate and launch a Diameter message that is intended for an HSS/AAA 110. In one embodiment, MME 104 may generate and launch a ULR message in response to receiving the TAU message. The ULR message may include the IMSI value associated with the TAU message.

In one embodiment, Diameter signaling router 106 may receive the message launched by MME 104. For example, as illustrated in FIG. 7, router 106 receives a ULR message launched by MME 104. Router 106 may use firewall/NAT module 700 for examining the received message and determining whether and/or how to process the message.

In one embodiment, router 106 using firewall/NAT module 700 may access database 706 for determining whether a received message satisfies a relevant firewall policy. For example, router 106 may query database 706 using an IMSI value and/or other parameters associated with a received Diameter message.

In one embodiment, if a received Diameter message satisfies a relevant firewall policy (e.g., as determined by an IMSI value and/or other information associated with the message), router 106 may route the Diameter message towards an appropriate destination (e.g., HSS/AAA 110). If the received Diameter message fails to satisfy a relevant firewall policy, router 106 may perform a mitigating action.

In one embodiment, mitigating actions may include, but are not limited to, discarding a Diameter message, generating an error code, generating an error message, communicating an error message to a Diameter node, generating an event record, generating a log entry, modifying a Diameter message, generating a second Diameter message based on a first Diameter message; modifying information in a Diameter message, modifying a Diameter message to satisfy a firewall policy, triggering NAT processing for a Diameter message, triggering routing of a message, and notifying an entity.

In response to receiving an indication that a received Diameter message fails to satisfy a firewall policy, router 106 (e.g., using firewall/NAT module 700) may deny, stop, or block further processing of the received message. Router 106 may also generate and launch a message towards an originating entity (e.g., MME 104) indicating that the message is blocked or deny from being forwarded or routed. For example, as illustrated in FIG. 7, router 106 (e.g., using firewall/NAT module 700) may determine that a rule associated with the IMSI value of a received message is not satisfied and subsequently may send a ULA message indicating that the message is blocked or denied further processing.

In one embodiment where a policy includes multiple rules, if one or more of these rules are not met (e.g., one or more parameters or characteristics indicate a blocked status), the message may be denied or blocked by router 106. In another embodiment where a policy includes multiple rules, if one or more of these rules are met (e.g., one or more parameters or characteristics indicate a allow status), the message may be allowed to be processed further by router 106.

In one embodiment, policies or rules may be associated with various priority or relevance values. For example, a message may be associated undesired characteristics associated with a blocked status and may also be associated with desired characteristics associated with an allowed status. In such situations, priority or relevance information may be used for determining whether a policy is satisfied.

It will be appreciated that the present subject matter herein contemplates using various policies and rules as appropriate. In one embodiment, router 106 (e.g., using firewall/NAT module 700) may enforce particular policies or rules depending on network configurations, network activities, and various other factors. For example, dynamic policies may be enforced based on suspicious network activity so as to prevent or mitigate denial of service (DoS) attacks or other security issues.

Figure 8:
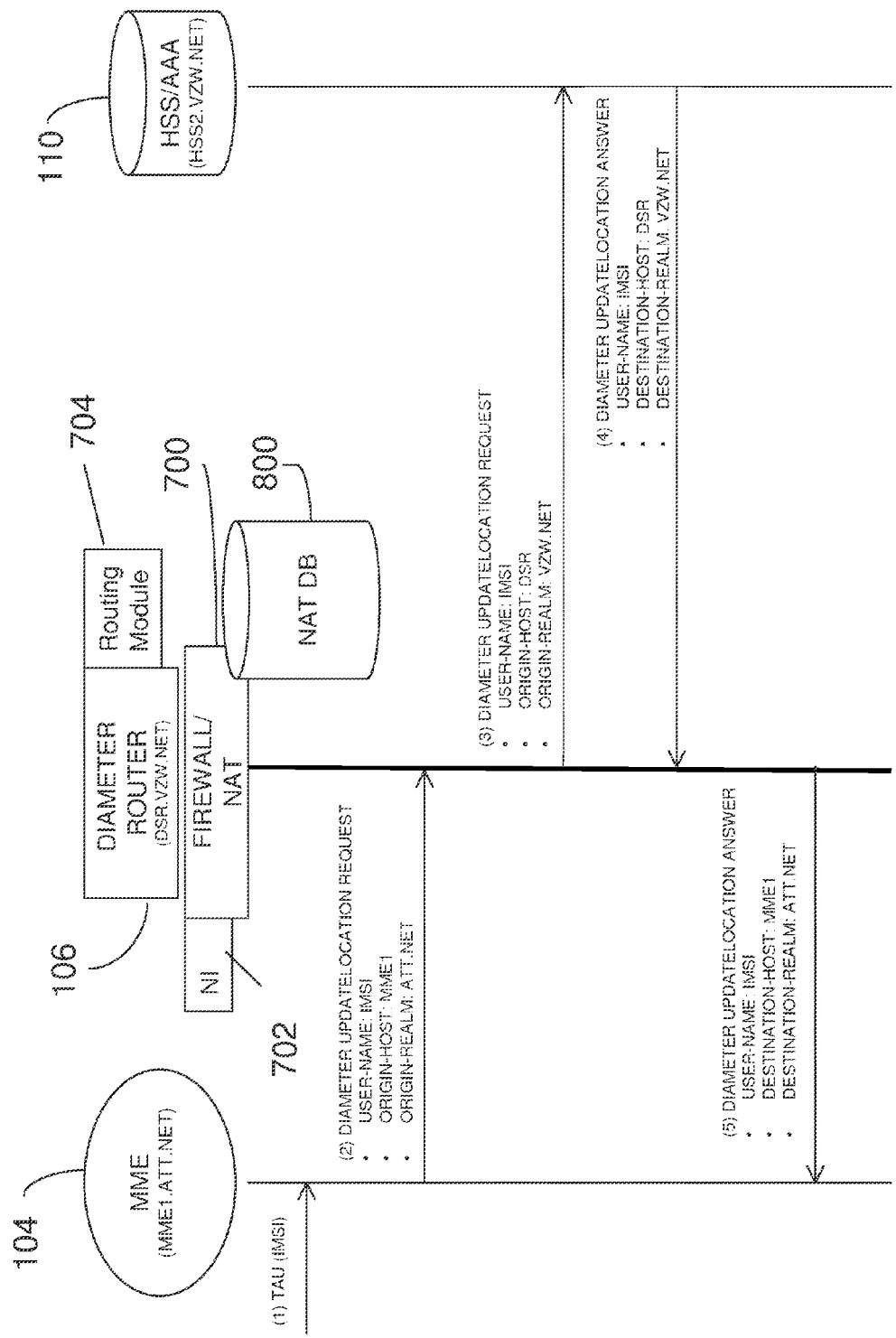
FIG. 8 is a signaling message flow diagram illustrating a Diameter signaling router providing network address translation (NAT) functionality according to an embodiment of the subject matter described herein.

FIG. 8 is a signaling message flow diagram illustrating a Diameter signaling router providing network address translation (NAT) functionality according to an embodiment of the subject matter described herein. In the embodiment illustrated in FIG. 8, a portion of exemplary LTE network 112 is depicted and router 106 includes firewall/NAT module 700 as described above. In this embodiment, router 106 using firewall/NAT module 700 may perform NAT-related functions, e.g., address translation and/or other parameter modification for communication between nodes.

In one embodiment, firewall/NAT module 700 may include functionality for accessing a NAT database 800 for maintaining NAT-related information. Database 800 may include information associated with NAT policies and/or NAT rules for determining whether and/or how to modify received messages or generate messages based on received messages (e.g., replacing an internal node identifier with an external node identifier being forwarding or routing a message).

In one embodiment, NAT database 800 may include various data structures representing NAT policies or NAT rules for a subscriber, device, or group of subscribers (e.g., subscribers of a particular service provider or cell). For example, database 800 may include one or more policy tables for subscribers of different service providers.

In one embodiment, database 800 may include information (e.g., state information, policies, rules) associated with NAT-related functions. For example, router 106 (e.g., using firewall/NAT module 700) may change or modify the value of any parameter in a received Diameter message prior to routing the Diameter message to HSS/AAA 110 and may maintain the original parameter information or other related data in database 800.

In one embodiment, router 106 (e.g., using firewall/NAT module 700) may use maintained information (e.g., stored in database 800) for providing associated NAT processing on related or corresponding messages, such as response messages returned by HSS/AAA 110. In another embodiment, router 106 may perform associated NAT processing on related or corresponding messages, such as response messages returned by HSS/AAA 110, without maintaining original message information. For example, message parameter values may identify a particular NAT policy to use on a response message.

In the embodiment illustrated in FIG. 8, MME 104 is configured to communicate or attempt to with one or more HSSs and/or AAA servers (hereinafter referred to as HSS/AAAs) 110 using Diameter signaling router 106. Router 106 may provide firewall functionality. In one embodiment, MME 104, router 106, and HSS/AAAs 110 may exchange messages via one or more LTE S6 interfaces. Diameter messages sent or received via an LTE S6 interface or other LTE-related interfaces may include one or more messages defined in the technical specification incorporated in its entirety above.

As illustrated in FIG. 8, a Diameter message may be received at MME 104. In one embodiment, the received Diameter message is a registration message referred to as a tracking area update (TAU) message. The TAU message may include UE-related information, such as an International Mobile Subscriber Identity (IMSI) value. In response to receiving the Diameter message, MME 104 may generate and launch a Diameter message that is intended for an HSS/AAA 110. In one embodiment, MME 104 may generate and launch a ULR message in response to receiving the TAU message. The ULR message may include the IMSI value associated with the TAU message.

In one embodiment, Diameter signaling router 106 may receive the message launched by MME 104. For example, as illustrated in FIG. 8, router 106 receives a ULR message launched by MME 104. Router 106 may use firewall/NAT module 800 for examining the received message and determining whether and/or how to route the message. In one embodiment, router 106 (e.g., using firewall/NAT module 700) may access NAT database 800 in making this determination.

In one embodiment, router 106 may use firewall/NAT module 700 for determining whether to perform NAT-related functions before routing a message. For example, after determining that a message is allowed to be processed further (e.g., routed) and determining an appropriate destination, router 106 may perform NAT-related functions. In a second example, a message may be modified by NAT-related functions concurrently, prior to, or after determining an appropriate destination for the message. In one embodiment, determining whether to perform NAT-related functions may be based on NAT policies or NAT rules.

For example, NAT database 800 may include an entry that associates a particular transaction with information for modifying the Origin Host and Origin Realm values in associated messages. In this example, router 106 may query NAT database 800 using an IMSI value and/or other transaction identifying information associated with a received Diameter message. NAT database 800 may indicate that the message associated with this subscriber or transaction requires one or more parameter values to be modified.

In one embodiment, router 106 (e.g., using firewall/NAT module 700) may modify parameter values of a message before routing the message. For example, as illustrated in FIG. 8, router 106 may modify origin host and origin realm parameter values of a ULR message such that the ULR message appears to originate from the same realm as destination. Router 106 may forward the modified ULR message towards HSS/AAA 110.

In one embodiment, HSS/AAA 110 may receive a Diameter message and respond. For example, in response to receiving a ULR message, HSS/AAA 110 may send a ULA message indicating that location information was received and stored. In one embodiment, a response message corresponding to the routed message (e.g., from HSS/AAA 110) may be processed or routed by router 106. For example, as illustrated in FIG. 8, router 106 may receive a ULR message from HSS/AAA 110. In one embodiment, router 106 (e.g., using firewall/NAT module 700) may perform associated reverse NAT processing on related or corresponding messages, such as response messages returned by HSS/AAA 110. For example, router 106 may use database 800 for obtaining original parameters or other information for modifying the received message before forwarding the message. In a second example, router 106 may use information in database 800 for generating a new message based on the received message. As illustrated in FIG. 8, the generated ULA message may include destination addressing or routing information associated with MME 104. Router 106 may route the generated message to an appropriate destination, e.g., the node that launched the associated query message.

In another embodiment, a response message corresponding to the routed message (e.g., from HSS/AAA 110) may not be processed or routed by router 106. For example, HSS/AAA 110 may provide destination addressing or routing information for sending a message towards MME 104 without router 106.

It will be appreciated that various NAT policies or NAT rules may be enforced by router 106 (e.g., using firewall/NAT module 700). Additionally, one or more policies or rules may have higher or lower priorities. It will be further appreciated that the present subject matter herein contemplates using various policies and rules as appropriate. In one embodiment, router 106 that includes firewall/NAT module 700 may perform NAT-related functions depending on network configurations, network activities, and various other factors. For example, NAT policies may be enforced based on network congestion, e.g., certain features or quality of service (QoS) parameters are modified to reduce bandwidth usage.

Figure 9A:
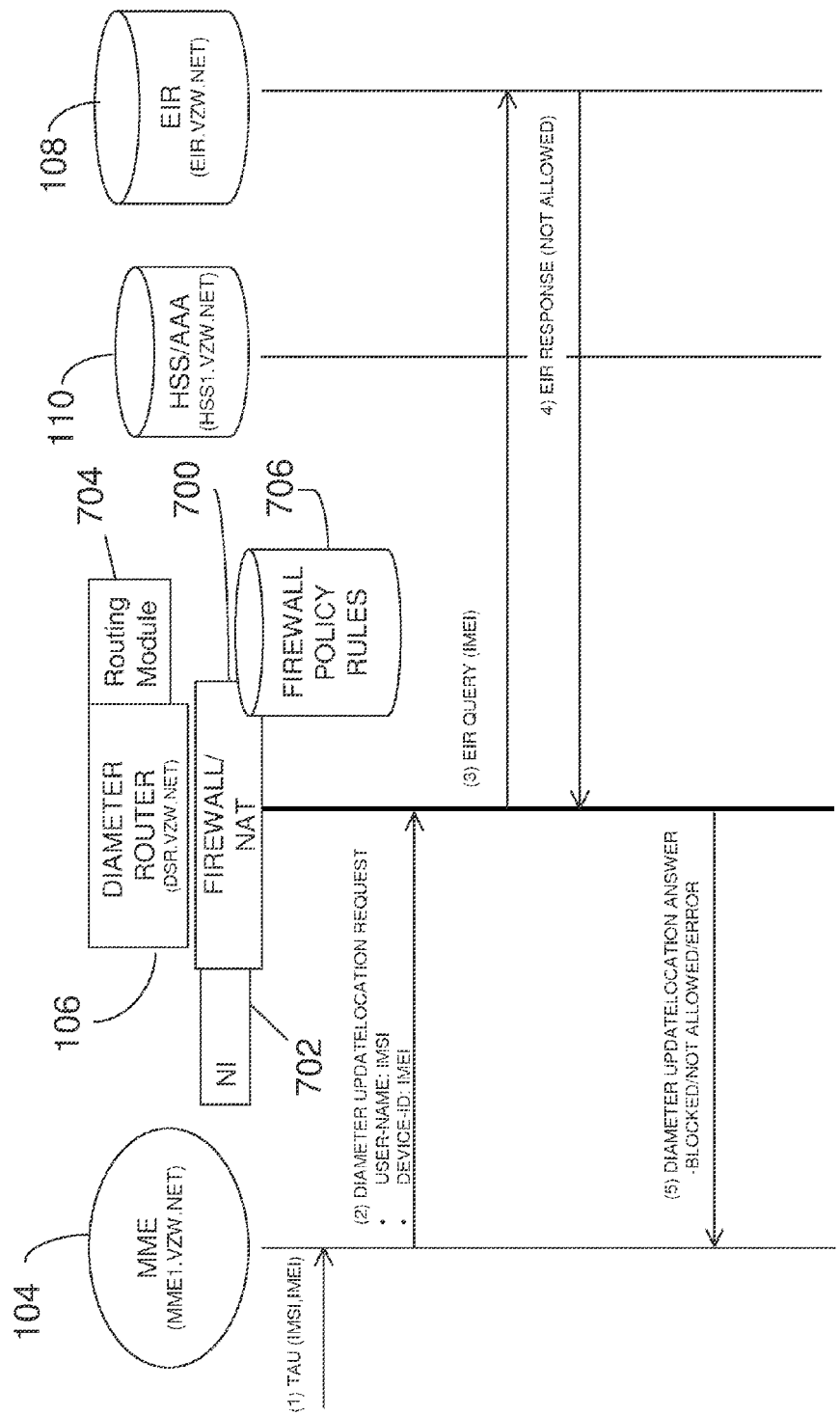
FIG. 9A is a signaling message flow diagram illustrating screening a message based on an equipment identity register (EIR) database response according to an embodiment of the subject matter described herein.

FIG. 9A is a signaling message flow diagram illustrating screening a message based on an equipment identity register (EIR) database response according to an embodiment of the subject matter described herein. In the embodiment illustrated in FIG. 9, a portion of exemplary LTE network 112 is depicted and router 106 is configured for performing device authorization. In one embodiment, router 106 (e.g., using firewall/NAT module 700) is configurable to access an Equipment Identity Register (EIR) database 108 for authorizing or blocking devices. For example, firewall/NAT module 700 may include functionality for accessing an EIR Database 108 to determine whether a device is authorized or blocked. In one embodiment, querying an EIR database 108 may be referred to as performing an EIR dip.

As stated above, EIR database 108 includes information associated with device or UE identification. In one embodiment, EIR database 108 may include a list of device identifiers (e.g., an International Mobile Equipment Identifier (IMEI)) and associated status regarding network accessibility. For example, EIR database 108 may include a list of device identifiers that are allowed to use a node or network (e.g., a whitelist) or not allowed to use a node or network (e.g., a blacklist).

In one embodiment, performing an EIR dip includes accessing EIR database 108 for determining whether equipment-related information associated with a Diameter message is present in EIR database 108 and allowing or blocking the Diameter message based on the response to determining whether equipment-related information associated with the Diameter message is present in EIR database 108.

In the embodiment illustrated in FIG. 9A, a Diameter message is received at MME 104. As illustrated in FIG. 9A, the received Diameter message may be a TAU message that includes an IMEI and IMSI value. In response to receiving the Diameter message, MME 104 may generate and launch a Diameter message that is intended for an HSS/AAA 110. For example, MME 104 may generate and launch a ULR message in response to receiving the TAU message. The ULR message may include the IMSI and IMEI values associated with the TAU message.

In FIG. 9A, Diameter signaling router 106 may receive the message launched by MME 104. For example, router 106 may receive the ULR message launched by MME 104. Router 106 may use firewall/NAT module 700 for examining the received message and determining whether and/or how to route the message.

Router 106 (e.g., using firewall/NAT module 700) may use the IMEI value in querying EIR database 108 for obtaining authorization information associated with the IMEI value. EIR database 108 or an appropriate node (e.g., an EIR database server) may respond indicating that the IMEI value or an associated device or subscriber is blocked or not allowed.

In one embodiment, in response to a receiving message indicating that the IMEI value associated with a message is blocked, router 106 (e.g., using firewall/NAT module 700) may deny, stop, or block further processing of the received message. Router 106 may also generate and launch a message towards an originating entity (e.g., MME 104) indicating that the message is blocked or deny from being forwarded or routed.

For example, as illustrated in FIG. 9A, router 106 (e.g., using firewall/NAT module 700) may determine that the IMEI value of a received message is blocked and may subsequently send a ULA message indicating that messages associated with the IMEI value is blocked or denied further processing. As such, router 106 (e.g., using firewall/NAT module 700) may shield or prevent HSS/AAA 100 or other network nodes from unnecessary signaling traffic, thereby reducing the load on network resources.

In one embodiment, EIR database 108 may be located externally of router 106. In another embodiment, EIR database 108 may be co-located or integrated with router 106.

Figure 9B:
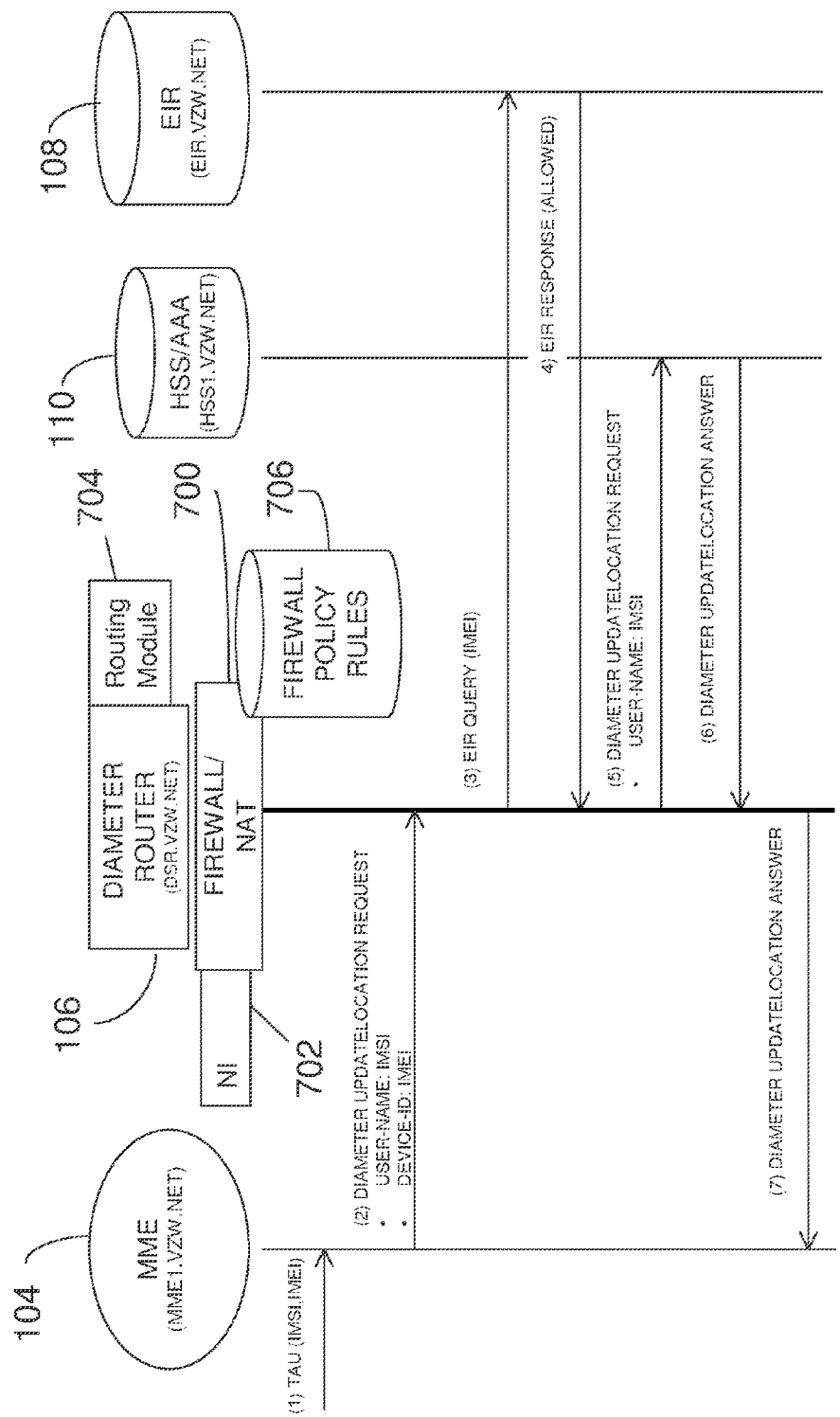
FIG. 9B is a signaling message flow diagram illustrating routing a message based on an equipment identity register (EIR) database response according to an embodiment of the subject matter described herein.

FIG. 9B is a signaling message flow diagram illustrating routing a message based on an equipment identity register (EIR) database response according to an embodiment of the subject matter described herein. In the embodiment illustrated in FIG. 9B, the nodes depicted in FIG. 9B are essentially the same as the nodes described in reference to FIG. 9A. Further, the first three messages of FIG. 9B, (FIG. 9B, messages 1, 2, and 3) are essentially the same as the first three messages of FIG. 9A. Therefore, descriptions of these nodes and the first three messages will not be repeated herein.

In the embodiment illustrated in FIG. 9B, in response to an EIR query for determining device authorization, an allowed or authorized response message is returned.

In one embodiment, in response to receiving an allowed or authorized message, router 106 may perform further processing (e.g., route messages associated with the authorized device). For example, as illustrated in FIG. 9B, router 106 may route a ULR message associated with the authorized IMEI towards an appropriate HSS/AAA 110. HSS/AAA 110 may receive the Diameter message and respond. For example, in response to receiving a ULR message, HSS/AAA 110 may send a ULA message indicating that location information was received and stored. In the embodiment illustrated in FIG. 9B, a response message corresponding to the routed message (e.g., from HSS/AAA 110) may be processed or routed by router 106. In another embodiment, a response message corresponding to the routed message (e.g., from HSS/AAA 110) may not be processed or routed by router 106.

Figure 10:
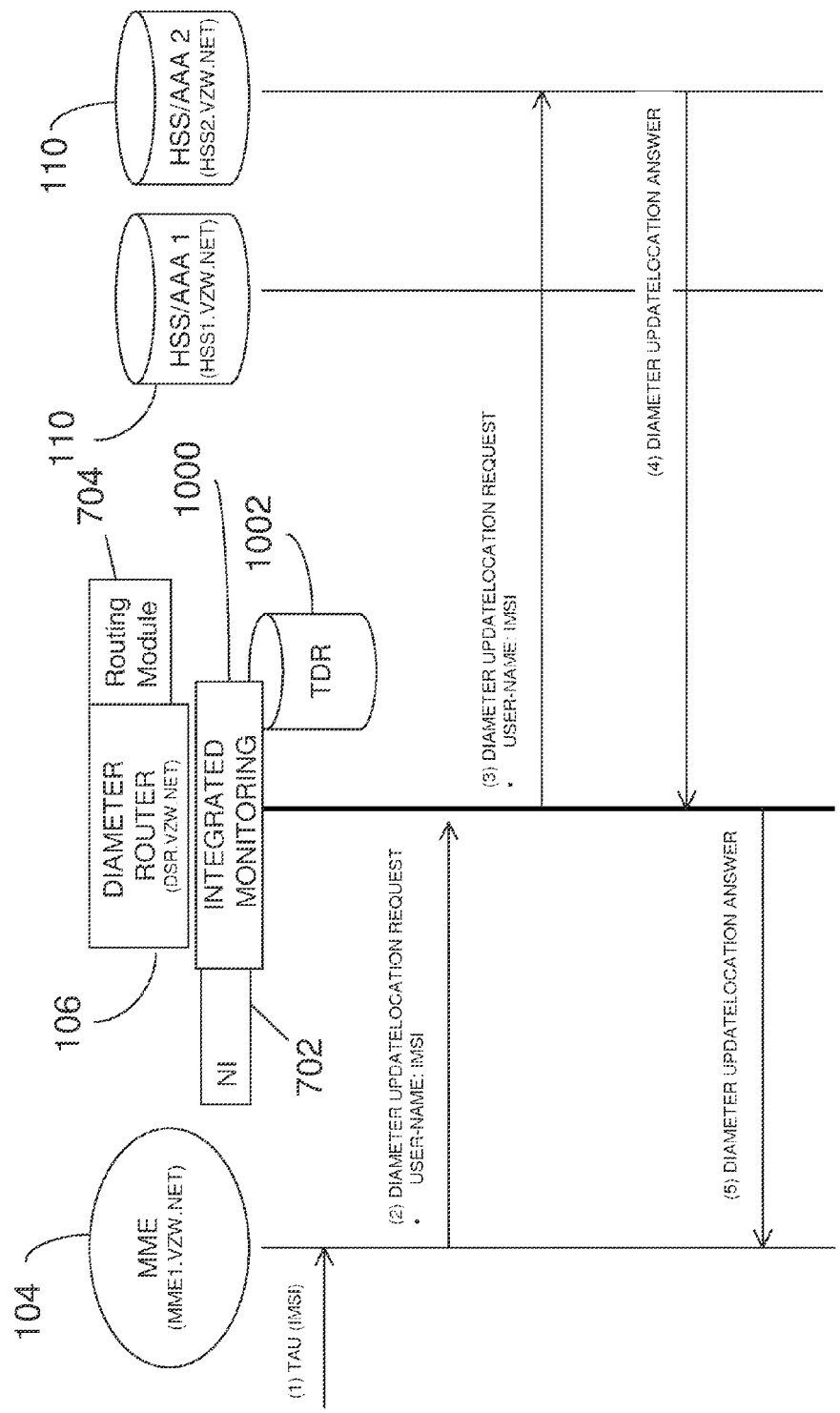
FIG. 10 is a signaling message flow diagram illustrating a Diameter signaling router with integrated message monitoring functionality according to an embodiment of the subject matter described herein.

FIG. 10 is a signaling message flow diagram illustrating a Diameter signaling router with integrated message monitoring functionality according to an embodiment of the subject matter described herein. In the embodiment illustrated in FIG. 10, a portion of exemplary LTE network 112 is depicted and router 106 is configured for performing message monitoring.

In one embodiment, router 106 includes message monitoring (MM) functionality 1000 for monitoring Diameter signaling message traffic transiting or traversing the node. MM module 1000 may be implemented in software in combination with hardware and/or firmware. Router 106 may also include network interface 702 and routing module 704 described above. In one exemplary embodiment, Diameter router 106 may include plural network interfaces 702 for receiving signaling messages from plural different sources. Integrated monitoring module 1000 may be implemented as a message copy function associated with each network interface 702 that identifies and copies Diameter signaling messages received by each network interface 702. Routing module 704 routes the original Diameter signaling messages received by each network interface 702 to its destination.

MM module 1000 may copy information from Diameter signaling messages that traverse Diameter signaling router 106. For example, MM module 1000 may identify and copy Diameter signaling messages associated with the establishment, progress, and tear down of a media session and generate or provide information for generating a transaction detail record (TDR) for the session. In another example, MM module 1000 may generate or provide information for generating usage measurements information, such as peg counts, for Diameter signaling messages that traverse router 106. Such peg counts can be configurable, for example, so that the network operator can obtain counts of Diameter signaling messages of a particular type, from a particular source, and/or to a particular destination flowing through router 106.

In one embodiment, MM module 1000 may provide information (e.g., copied portions) associated with an observed Diameter message to one or more applications. For example, applications for receiving copied information provided by router 106 may include a billing application, a billing verification application, a TDR generating application, a TDR database application, a lawful surveillance application, a network analysis application, a network statistics application, and a fraud mitigation application. In one embodiment, an application for receiving copied information provided by router 106 may be co-located or integrated with router 106. In another embodiment, an application for receiving copied information provided by router 106 may be located external of router 106.

In the embodiment illustrated in FIG. 10, router 106 (e.g., using MM module 1000) is configurable for monitoring Diameter signaling messages transiting the node. In one embodiment, monitored messages may include one or more messages defined in the technical specification incorporated in its entirety above.

Router 106 (e.g., using MM module 1000) may maintain or provide information for maintaining a TDR database 1002. TDR database 1002 may include functionality for storing one or more TDRs associated with observed messages. In one embodiment, TDRs may include at least of a complete copy of an observed Diameter message, a portion of an observed Diameter message, and information (e.g., statistics, metrics) associated with observed Diameter signaling traffic.

In one embodiment, TDR database 1002 may be co-located or integrated with router 106. In another embodiment, TDR database 1002 may be located external of router 106.

In the embodiment illustrated in FIG. 10, the messages depicted are essentially the same as described in reference to FIG. 3 and, as such, their description will not be repeated herein. However, in the embodiment illustrated in FIG. 10, one or more of the messages, portions thereof, or information associated with the message that transit router 106 may be copied and the copied information may be provided to an application using MM module 1000. For example, a TDR generating application may generate one or more TDRs using copied information provided by router 106. The TDR generation application or other entity may the one or more TDRs in TDR database 1002. The TDRs may include information associated with the messages that transited router 106, e.g., via an LTE interface, such as an LTE S6 or S13 interface.

Router 106 or another entity (e.g., an accounting module or network operator) may use TDR-related information for various purposes, e.g., network analysis, accounting, and billing purposes. In a second example, TDR-related information may be used for lawful surveillance of messages. It will be appreciated that various other uses and purposes may be readily apparent and are within the scope of the present disclosure.

Figure 11:
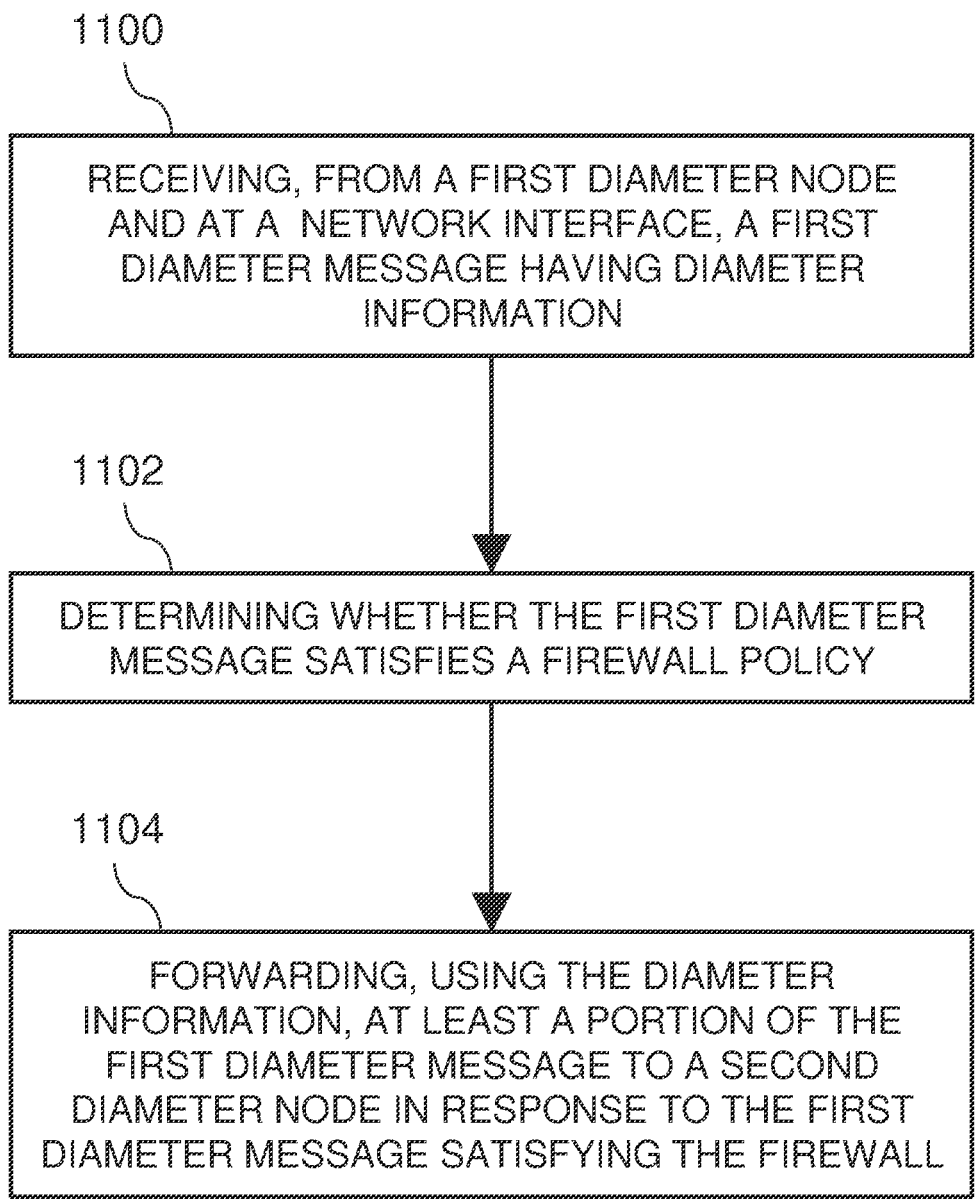
FIG. 11 is a flow chart illustrating exemplary steps for Diameter routing and firewall filtering according to an embodiment of the subject matter described herein.

FIG. 11 is a flow chart illustrating exemplary steps for Diameter routing and firewall filtering according to an embodiment of the subject matter described herein. In one embodiment, one or more exemplary steps described herein may be performed at or performed by Diameter signaling router 106.

Referring to FIG. 11, in step 1100, a first Diameter message having Diameter information may be received via a network interface from a first Diameter node. For example, a ULR message may be received as illustrated in FIG. 2. In one embodiment, the first Diameter node may be an MME (e.g., MME 104). In another embodiment, the first Diameter node may be an HSS or AAA (e.g., HSS/AAA 110).

In step 1102, it may be determined whether the first Diameter message satisfies a firewall policy, where the firewall policy is based on at least a portion of the Diameter information in the first Diameter message. In one embodiment, the portion includes any information in a Diameter header portion and a Diameter data portion. For example, the Diameter header portion may include information regarding a Diameter version, a Diameter message length, a Diameter flag, a command code (CC), a Diameter application identifier (ID), a hop by hop ID, and an end to end ID. In one embodiment, the Diameter data portion may include any information associated with attribute values pairs. For example, the Diameter Data portion may include information regarding an AVP code, an AVP flag, an AVP length, a vendor ID, and AVP data.

In one embodiment, a firewall policy includes at least one of a rule for determining whether a Diameter message is associated with a desired characteristics, a rule for determining whether a Diameter message is associated with an undesired characteristics, information for accessing a data structure for determining whether a Diameter message satisfies a firewall policy, information for accessing a whitelist, and information for accessing a blacklist.

In one embodiment, a firewall module may determine whether the first Diameter message satisfies a firewall policy. In this embodiment, the firewall module may include any or all firewall/NAT module 700 described above. For example, firewall module may include a network address translation (NAT) module for performing network address translation (NAT) processing on the first Diameter message and performing NAT on the first Diameter message. In one embodiment, the NAT module may also be configured to perform NAT processing on a response message destined to the first Diameter node that corresponds to the first Diameter message.

In step 1104, in response to determining that the first Diameter message satisfies a firewall policy, forwarding, using the Diameter information, at least a portion of the first Diameter message towards a second Diameter node. In one embodiment, a routing module may forward, using the Diameter information, at least a portion of the first Diameter message towards a second Diameter node. In this embodiment, routing module may include any or all forwarding and routing functionality described above. For example, a ULR message may be routed as illustrated in FIG. 2. In one embodiment, the second Diameter node may be an HSS or AAA (e.g., HSS/AAA 110). In another embodiment, the second Diameter node may be an MME (e.g., MME 104).

In one embodiment, router 106 or firewall module may include a mitigation module for performing a mitigating action in response to the first Diameter message failing to satisfy the firewall policy. In one embodiment, mitigating actions may include discarding the first Diameter message, generating an error code, generating an error message, communicating an error message to a Diameter node, generating an event record, generating a log entry, modifying the first Diameter message, generating a second Diameter message based on the first Diameter message; modifying the Diameter information in the first Diameter message, modifying the first Diameter message to satisfy the firewall policy, triggering NAT processing for a Diameter message, triggering the routing module to handle the modified first Diameter message, triggering the routing module to handle the second Diameter message, and notifying an entity.

Figure 12:
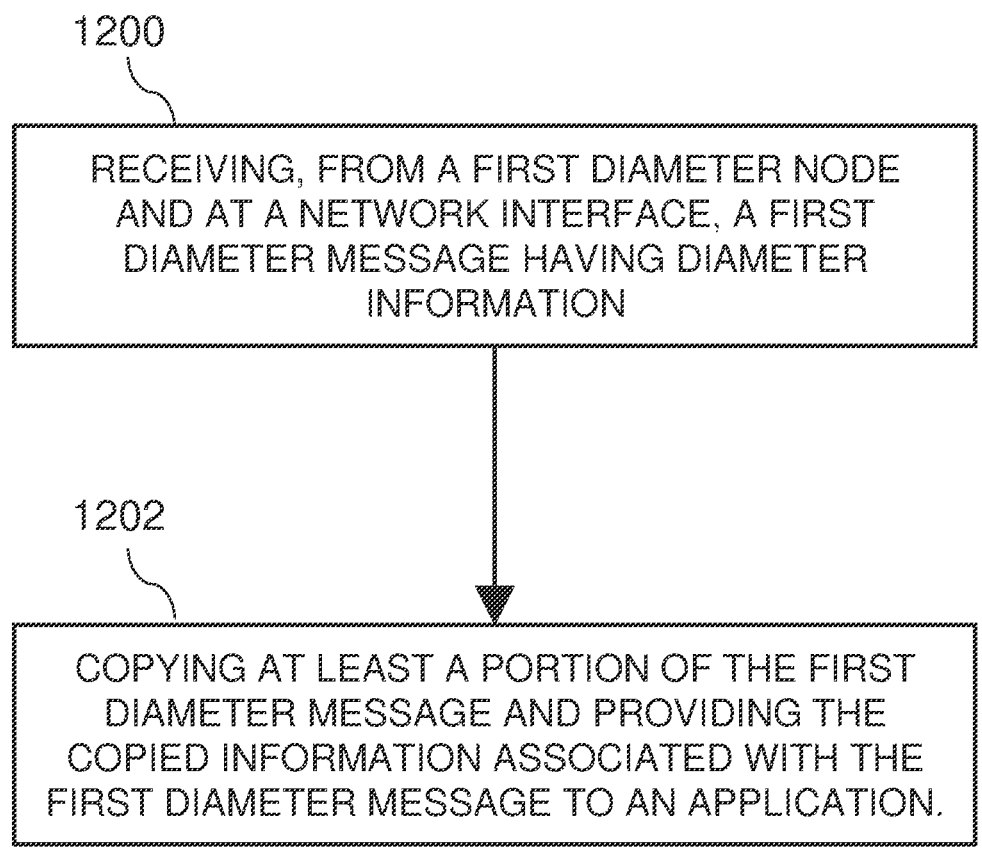
FIG. 12 is a flow chart illustrating exemplary steps for monitoring Diameter signaling messages according to an embodiment of the subject matter described herein.

FIG. 12 is a flow chart illustrating exemplary steps for monitoring Diameter signaling messages according to an embodiment of the subject matter described herein. In one embodiment, one or more exemplary steps described herein may be performed at or performed by Diameter signaling router 106.

Referring to FIG. 12, in step 1200, a first Diameter message having Diameter information may be received via a network interface from a first Diameter node. For example, a ULR message may be received as illustrated in FIG. 2. In one embodiment, the interface may include an LTE interface, such as an S6 interface or an S13 interface. In one embodiment, the first Diameter node may be at least one of an MME (e.g., MME 104), an HSS, an AAA server (e.g., HSS/AAA 110), and an EIR node.

In step 1202, at least a portion of the first Diameter message may be copied and the copied information associated with the first Diameter message may be provided to an application. For example, monitoring module may include functionality for providing copied information to at least one of a billing application, a billing verification application, a TDR generating application, a TDR database application, a lawful surveillance application, a network analysis application, and a fraud mitigation application.

In one embodiment, the copied portion of the first Diameter message includes at least one: a copy of the first Diameter message, a portion of the first Diameter message, and statistics associated with the first Diameter message. For example, statistics may include characteristics about a session (e.g., the number of packets exchanged in a session and the bandwidth usage). In one embodiment, the monitoring module may include functionality for updating or providing information to an application (e.g., a network statistics or metrics application) for updating LTE network usage measurements information based on the first Diameter message.

Figure 13:
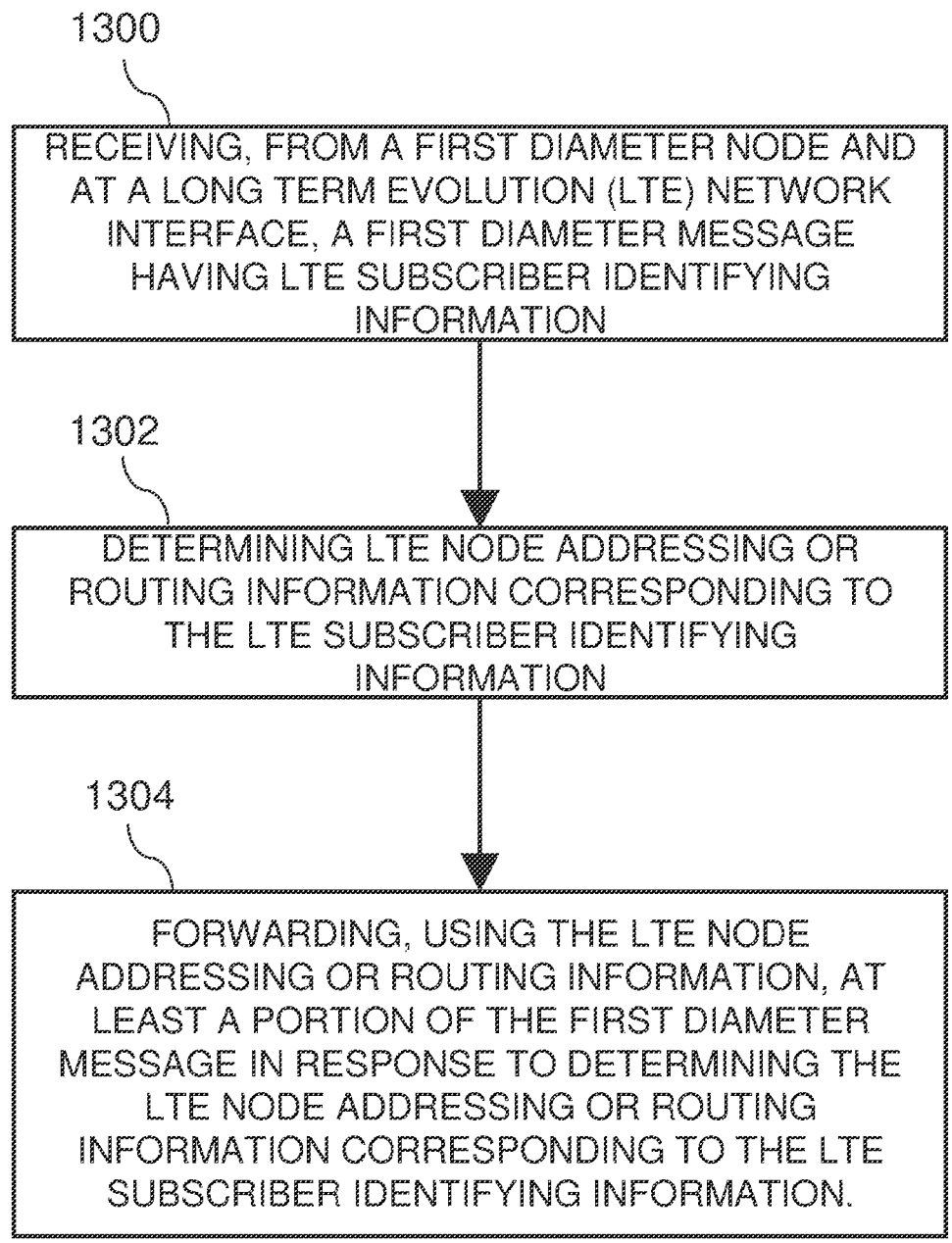
FIG. 13 is a flow chart illustrating exemplary steps for routing Diameter signaling messages according to an embodiment of the subject matter described herein.

FIG. 13 is a flow chart illustrating exemplary steps for routing Diameter signaling messages according to an embodiment of the subject matter described herein. In one embodiment, one or more exemplary steps described herein may be performed at or performed by Diameter signaling router 106.

Referring to FIG. 13, in step 1300, a first Diameter message having LTE subscriber identifying information may be received via an LTE interface from a first Diameter node. For example, a ULR message may be received as illustrated in FIG. 2. In one embodiment, the LTE subscriber identifying information may include one or more of a subscriber identifier, a device identifier, an international mobile subscriber identifier (IMSI), a mobile subscriber integrated services digital network (MSISDN) number, a short code, a uniform resource identifier (URI), an international mobile equipment identifier (IMEI), a mobile identification number (MIN)).

In step 1302, LTE node addressing or routing information corresponding to the LTE subscriber identifying information may be determined. In one embodiment, a subscriber location module may determine LTE node addressing or routing information corresponding to the LTE subscriber identifying information. In this embodiment, the subscriber location module may include any or all processing functionality described above. For example, subscriber location module may inspect or examine a received message for LTE subscriber identifying information. In one embodiment, the subscriber location module may query one or more databases to obtain the LTE addressing or routing information for forwarding the first Diameter message.

In one embodiment, the one or more databases include at least one of: a range-based section for associating groups of subscriber identifiers and addressing or routing information for associated nodes and an exception-based section for associating subscriber identifiers and addressing or routing information for associated nodes that are different from associations in the range-based section.

In one embodiment, the subscriber location module may perform address resolution for determining the addressing or routing information. For example, the subscriber location module may obtain addressing or routing information and determining that the addressing or routing information needs to be resolved (e.g., addressing or routing information may be in a non-preferred format, such as an FQDN value or non-routable address). The subscriber location module may query a DNS server or other appropriate node for suitable or preferred addressing or routing information (e.g., a SIP URI). In one embodiment, addressing or routing information may include one or more of a node identifier, a uniform resource identifier (URI), a fully qualified domain name (FQDN), and an Internet protocol (IP) address.

In step 1304, using the LTE node addressing or routing information, at least a portion of the first Diameter message may be forwarded in response to determining the LTE node addressing or routing information corresponding to the LTE subscriber identifying information. In one embodiment, a routing module may perform the forwarding. In this embodiment, routing module may include any or all forwarding and routing functionality described above. For example, a ULR message may be routed as illustrated in FIG. 2. In one embodiment, forwarding at least a portion of the first Diameter message includes generating a new message based on the first Diameter message.

In one embodiment, the Diameter signaling router may be configured for forwarding in a relay mode such that the first Diameter message is relayed towards the second Diameter node. In another embodiment, the Diameter signaling router may be configured for forwarding in a proxy mode such that the Diameter signaling router acts as proxy for the first Diameter node or a second Diameter node. In yet another embodiment, the Diameter signaling router may be configured for forwarding in a redirect mode such that the first Diameter node is instructed to forward the first Diameter message towards a second Diameter node.

In one embodiment, nodes may include one of a home subscriber server (HSS), a gateway node, a foreign gateway node, a server, a mobility management entity (MME) node, an authentication, authorization, and accounting (AAA) server, a Policy Charging Rule Function (PCRF), a Policy and Charging Enforcement Function (PCEF), and an equipment identity register (EIR) node.

Various LTE-based embodiments for performing various message processing-related (e.g., routing and security) functions have been described above. It will be appreciated that the above examples are illustrative and that the functionality described herein may implemented for use with or applicable for various Diameter messages, various Diameter-related interfaces and various Diameter-related nodes, including messages, interfaces, and nodes not explicitly described above, without departing from the scope of the subject matter described herein.

Any of the embodiments described herein can be combined with each other without departing from the scope of the subject matter described herein. For example, any of the embodiments above of a Diameter signaling router with integrated monitoring functionality as described above can be combined with any of the embodiments above of a Diameter signaling router with firewall filtering functionality to produce a Diameter signaling router with integrated monitoring and firewall filtering functionality without departing from the scope of the subject matter described herein.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for monitoring Diameter signaling messages, the system comprising:
   a Diameter signaling router, comprising:
      a first network interface for receiving, from a first Diameter node, a first Diameter message having Diameter information, wherein the first network interface includes a first Long Term Evolution (LTE) interface;
      a second network interface for receiving, from a second Diameter node, a second Diameter message associated with the first Diameter message, wherein the second network interface includes a second LTE interface different from the first LTE interface; and
      an integrated monitoring module located within the Diameter signaling router for copying at least a portion of the first Diameter message and at least a portion of the second Diameter message and providing the copied portions to an application for generating transaction records or network statistics, the application located at a node distinct from the Diameter signaling router, the first Diameter node, and the second Diameter node, wherein the first message and the second message are selected for copying based on an identifier identifying a same session and wherein the copied portions include information about the session, wherein the integrated monitoring module is configured to provide information to the application for updating LTE network usage measurements information by providing a count of the number of Diameter messages exchanged during the session or a bandwidth usage by Diameter messages for the session, wherein the integrated monitoring module is configured to generate or provide information to the application for generating a transaction detail record (TDR) based on information in the first Diameter message.

2. The system of claim 1 wherein the first Diameter message or the second Diameter message includes one of: an UpdateLocation Request (ULR) message, an UpdateLocation Answer (ULA) message, an AuthenticationInformation Request (AIR) message, an AuthenticationInformation Answer (AIA) message, a CancelLocation Request (CLR) message, a CancelLocation Answer (CLA) message, an InsertSubscriberData Request (IDR) message, an InsertSubscriberData Answer (IDA) message, a DeleteSubscriberData Request (DSR) message, a DeleteSubscriberData Answer (DSA) message, a PurgeUE Request (PUR) message, a PurgeUE Answer (PUA) message, a Reset Request (RSR) message, a Reset Answer (RSA) message, a Notify Request (NOR) message, a Notify Answer (NOA) message, an MEIdentityCheck Request (ECR) message, and an MEIdentityCheck Answer (ECA) message.

3. The system of claim 1 wherein the copied portion of the first Diameter message includes at least one of: a parameter, a subscriber identifier, a device identifier, an international mobile subscriber identifier (IMSI), a mobile subscriber integrated services digital network (MSISDN) number, a short code, a uniform resource identifier (URI), an international mobile equipment identifier (IMEI), a mobile identification number (MIN), an Auth-Session-State parameter, a Origin-Host parameter, a Origin-Realm parameter, a Destination-Host parameter, a Destination-Realm parameter, a User-Name parameter, a Supported-Features parameter, a Terminal-Information parameter, a RAT-Type parameter, a ULR-Flags parameter, a Visited-PLMN-Id parameter, a SGSN-Number parameter, a AVP parameter, a Proxy-Info parameter, and a Route-Record parameter.

4. The system of claim 1 wherein the monitoring module is configured to examine the Diameter information in the first Diameter message for determining information associated with the first Diameter message to provide.

5. The system of claim 1 wherein the monitoring module is configured to provide the copied portions to at least one of a billing application, a billing verification application, a transaction detail record (TDR) generating application, a TDR database application, a lawful surveillance application, a network analysis application, a network statistics application, and a fraud mitigation application.

6. The system of claim 1 wherein the application is configured to maintain the TDR in a database.

7. The system of claim 1 wherein the copied portions include at least one of: a copy of the first Diameter message, a portion of the first Diameter message, and statistics associated with the first Diameter message.

8. The system of claim 1 wherein the first Diameter node or the second Diameter node is at least one of: a home subscriber server (HSS), a mobility management entity (MME) node, an authentication, authorization, and accounting (AAA) server, a Policy Charging Rule Function (PCRF), a Policy and Charging Enforcement Function (PCEF), a Subscription Profile Repository (SPR), an Online Charging System (OCS), an IP Multimedia Subsystem (IMS) Call Session Control Function (CSCF), and an equipment identity register (EIR) node.

9. The system of claim 1 wherein the monitoring module is configured to update or provide information to an application for updating Long Term Evolution (LTE) network usage measurements information based on the first Diameter message.

10. A method for monitoring Diameter signaling messages, the method comprising:
at a Diameter signaling router:
receiving, from a first Diameter node and at a first network interface, a first Diameter message having Diameter information, wherein the first network interface includes a first Long Term Evolution (LTE) interface;
receiving, from a second Diameter node and at a second network interface, a second Diameter message associated with the first Diameter message, wherein the second network interface includes a second LTE interface different from the first LTE interface;
copying at least a portion of the first Diameter message and at least a portion of the second Diameter message and providing the copied portions to an application for generating transaction records or network statistics, wherein providing the copied portions to the application includes generating or providing information to the application for generating a transaction detail record (TDR) based on information in the first Diameter message, the application located at a node distinct from the Diameter signaling router, the first Diameter node, and the second Diameter node, wherein the first message and the second message are selected for copying based on an identifier identifying a same session and wherein the copied portions include information about the session; and
providing information to the application for updating LTE network usage measurements information by providing a count of the number of Diameter messages exchanged during the session or a bandwidth usage by Diameter messages for the session.

11. The method of claim 10 wherein the first Diameter message or the second Diameter message includes one of: an UpdateLocation Request (ULR) message, an UpdateLocation Answer (ULA) message, an AuthenticationInformation Request (AIR) message, an AuthenticationInformation Answer (AIA) message, a CancelLocation Request (CLR) message, a CancelLocation Answer (CLA) message, an InsertSubscriberData Request (IDR) message, an InsertSubscriberData Answer (IDA) message, a DeleteSubscriberData Request (DSR) message, a DeleteSubscriberData Answer (DSA) message, a PurgeUE Request (PUR) message, a PurgeUE Answer (PUA) message, a Reset Request (RSR) message, a Reset Answer (RSA) message, a Notify Request (NOR) message, a Notify Answer (NOA) message, an MEIdentityCheck Request (ECR) message, and an MEIdentityCheck Answer (ECA) message.

12. The method of claim 10 wherein the copied portion of the first Diameter message includes at least one of: a parameter, a subscriber identifier, a device identifier, an international mobile subscriber identifier (IMSI), a mobile subscriber integrated services digital network (MSISDN) number, a short code, a uniform resource identifier (URI), an international mobile equipment identifier (IMEI), a mobile identification number (MIN), an Auth-Session-State parameter, a Origin-Host parameter, a Origin-Realm parameter, a Destination-Host parameter, a Destination-Realm parameter, a User-Name parameter, a Supported-Features parameter, a Terminal-Information parameter, a RAT-Type parameter, a ULR-Flags parameter, a Visited-PLMN-Id parameter, a SGSN-Number parameter, a AVP parameter, a Proxy-Info parameter, and a Route-Record parameter.

13. The method of claim 10 wherein monitoring includes examining the Diameter information in the first Diameter message for determining information associated with the first Diameter message to provide.

14. The method of claim 10 wherein the application includes at least one of a billing application, a billing verification application, a transaction detail record (TDR) generating application, a TDR database application, a lawful surveillance application, a network analysis application, a network statistics application, and a fraud mitigation application.

15. The method of claim 10 wherein generating the TDR includes maintaining the TDR in a database.

16. The method of claim 10 wherein the copied portions include at least one of: a copy of the first Diameter message, a portion of the first Diameter message, and statistics associated with the first Diameter message.

17. The method of claim 10 wherein the first Diameter node or the second Diameter node is at least one of: a home subscriber server (HSS), a gateway node, a foreign gateway, a server, a mobility management entity (MME) node, an authentication, authorization, and accounting (AAA) server, a Policy Charging Rule Function (PCRF), a Policy and Charging Enforcement Function (PCEF), a Subscription Profile Repository (SPR), an Online Charging System (OCS), an IP Multimedia Subsystem (IMS) Call Session Control Function (CSCF), and an equipment identity register (EIR) node.

18. The method of claim 10 wherein monitoring includes updating or providing information for updating Long Term Evolution (LTE) network usage measurements information based on the first Diameter message.

19. A non-transitory computer readable medium having stored thereon executable instructions that when executed by the processor of a computer control the computer to perform steps comprising:
at a Diameter signaling router:
receiving, from a first Diameter node and at a first network interface, a first Diameter message having Diameter information, wherein the first network interface includes a first Long Term Evolution (LTE) interface;
receiving, from a second Diameter node and at a second network interface, a second Diameter message associated with the first Diameter message, wherein the second network interface includes a second LTE interface different from the first LTE interface;
copying at least a portion of the first Diameter message and at least a portion of the second Diameter message and providing the copied portions to an application for generating transaction records or network statistics, wherein providing the copied portions to the application includes generating or providing information to the application for generating a transaction detail record (TDR) based on information in the first Diameter message, the application located at a node distinct from the Diameter signaling router, the first Diameter node, and the second Diameter node, wherein the first message and the second message are selected for copying based on an identifier identifying a same session and wherein the copied portions include information about the session; and providing information to the application for updating LTE network usage measurements information by providing a count of the number of Diameter messages exchanged during the session or a bandwidth usage for the session.

* * * * *